US010231165B2

(12) United States Patent
Vajapeyam et al.

(10) Patent No.: US 10,231,165 B2
(45) Date of Patent: Mar. 12, 2019

(54) RRM MEASUREMENT AND REPORTING FOR LICENSE ASSISTED ACCESS

(71) Applicant: QUALCOMM Incorporated, San Diego, CA (US)

(72) Inventors: Madhavan Srinivasan Vajapeyam, San Diego, CA (US); Aleksandar Damnjanovic, Del Mar, CA (US); Peter Gaal, San Diego, CA (US); Tao Luo, San Diego, CA (US); Amir Aminzadeh Gohari, Sunnyvale, CA (US); Masato Kitazoe, Hachiouji (JP)

(73) Assignee: Qualcomm Incorporated, San Diego, CA (US)

( * ) Notice: Subject to any disclaimer, the term of this patent is extended or adjusted under 35 U.S.C. 154(b) by 101 days.

(21) Appl. No.: 15/138,769

(22) Filed: Apr. 26, 2016

(65) Prior Publication Data

US 2016/0338118 A1    Nov. 17, 2016

Related U.S. Application Data

(60) Provisional application No. 62/161,167, filed on May 13, 2015.

(51) Int. Cl.
*H04W 40/24* (2009.01)
*H04B 17/318* (2015.01)
(Continued)

(52) U.S. Cl.
CPC ........ *H04W 40/244* (2013.01); *H04B 17/318* (2015.01); *H04J 11/0093* (2013.01);
(Continued)

(58) Field of Classification Search
None
See application file for complete search history.

(56) References Cited

U.S. PATENT DOCUMENTS

2010/0309836 A1* 12/2010 Sugawara ......... H04W 72/1231
                                                370/312
2015/0092582 A1*  4/2015 Liao ...................... H04J 11/005
                                                370/252
(Continued)

OTHER PUBLICATIONS

Huawei., et al., "Considerations of Measurement issues in LAA," 3GPP TSG-RAN WG2 Meeting #89bis, R2-151178, Bratislava, Slovakia, Apr. 20-24, 2015, 5 pgs., XP050936152, 3rd Generation Partnership Project.
(Continued)

*Primary Examiner* — Christine T Duong
(74) *Attorney, Agent, or Firm* — Holland & Hart LLP

(57) ABSTRACT

Methods, systems, and devices for radio resource management (RRM) measurement and reporting for license assisted access (LAA) cells operating in unlicensed or shared frequency spectrum are described. A user equipment (UE) may receive an RRM measurement configuration including a channel occupancy parameter for measuring neighbor cells of a shared frequency band. The channel occupancy parameter may be used to determine a channel occupancy metric that may be sent to a base station for cell selection. The channel occupancy metric may include an averaged or filtered received signal strength and may be reported for serving cells and/or intra-frequency neighbor cells. A base station may further configure a UE with a discovery reference signals (DRS) measurement timing configuration (DMTC), which may include an extended DMTC search window. The UE may search for DRS transmissions from neighbor cells according to the DMTC.

17 Claims, 18 Drawing Sheets

(51) Int. Cl.
*H04L 29/08* (2006.01)
*H04J 11/00* (2006.01)
*H04W 48/18* (2009.01)
*H04W 16/14* (2009.01)
*H04W 72/08* (2009.01)

(52) U.S. Cl.
CPC ........... *H04L 69/323* (2013.01); *H04W 48/18* (2013.01); *H04W 16/14* (2013.01); *H04W 72/082* (2013.01)

(56) References Cited

U.S. PATENT DOCUMENTS

2016/0302230 A1 10/2016 Novlan et al.
2017/0142746 A1* 5/2017 Koorapaty ........ H04W 72/1242
2017/0325115 A1* 11/2017 Matsumoto ........... H04W 24/08

OTHER PUBLICATIONS

Samsung, "Discussion on RRM for LAA," 3GPP TSG RAN WG1 Meeting #80bis, R1-151620, Belgrade, Serbia Apr. 20-24, 2015, 4 pgs., XP050934490, 3rd Generation Partnership Project.
IPEA/EP, Second Written Opinion of the International Preliminary Examining Authority, Int'l Application No. PCT/US2016/029516, dated Mar. 27, 2017, European Patent Office, Munich, DE, 24 pgs.
Coolpad, "Discussion on High Layer Impacts of LAA," 3GPP TSG-RAN WG2 #89, Athens, Greece, R2-150174, Feb. 9-13, 2015, 3 pgs., XP_50935520A, 3rd Generation Partnership Project.
Ericsson, "RSSI Measurement for DRS," 3GPP TSG RAN WG1 Meeting #78, Dresden, Germany, R1-143320, Aug. 18-22, 2014, 3 pgs., XP_50786793A, 3rd Generation Partnership Project.
ETRI, "DRS Based RSRQ Measurement," 3GPP TSG RAN WG1 Meeting #78, Dresden, Germany, R1-143047, Aug. 18-22, 2014, 3 pgs., XP_50788526A, 3 pgs., 3rd Generation Partnership Project.
ISA/EP, International Search Report and Written Opinion of the International Searching Authority, Int'l Appl. No. PCT/US2016/029516, dated Jul. 4, 2016, European Patent Office, Rijswijk, NL, 21 pgs.
Mediatek Inc., "DRS Enhancements for RRM/CSI Measurements in LAA," 3GPP TSG RAN WG1 Meeting #80bis, Belgrade, Serbia, R1-151941, Apr. 20-24, 2015, 5 pgs., XP_50934795A, 3rd Generation Partnership Project.
QUALCOMM Incorporated, "Required Functionality for Support of LAA-LTE," 3GPP TSG-RAN WG2 Meeting #89, Athens, Greece, R2-150517, Feb. 9-13, 2015, 4 pgs., XP_50935763A, 3rd Generation Partnership Project.
QUALCOMM Incorporated, "Considerations on RRM Measurements for LAA-LTE," 3GPP TSG-RAN WG2 Meeting #90bis, Fukuoka, Japan, R2-152708, May 25-29, 2015, 6 pgs., XP_50972115A, 3rd Generation Partnership Project.
RAN2 Chairman (Ericsson), "Chairman Notes," 3GPP TSG RAN WG2 #89bis, Bratislava, Slovakia, Apr. 20-24, 2015, 64 pgs., XP_50953613A, 3rd Generation Partnership Project.
Samsung, "Discussion on Carrier Selection for LAA," 3GPP TSG RAN WG1 #80bis, Belgrade, Serbia, R1-152135, Apr. 20-24, 2015, 3 pgs., XP_50934979A, 3rd Generation Partnership Project.
ZTE, "Considerations on Measurements for LAA," 3GPP TSG RAN WG1 Ad-hoc Meeting, Paris, France, R1-151022, Mar. 24-26, 2015, 6 pgs., XP_50951396A, 3rd Generation Partnership Project.

* cited by examiner

RRM MEASUREMENT AND REPORTING FOR LICENSE ASSISTED ACCESS

CROSS REFERENCES

The present application for patent claims priority to U.S. Provisional Patent Application No. 62/161,167 by Vajapeyam, et al., entitled "RRM Measurement and Reporting for LAA," filed May 13, 2015, assigned to the assignee hereof.

BACKGROUND

Field of Disclosure

The following relates generally to wireless communication, and more specifically to radio resource management (RRM) measurement and reporting for license assisted access (LAA).

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple access communications system may include a number of base stations, each simultaneously supporting communication for multiple communication devices, which may be otherwise known as user equipment (UE).

In an LTE or LTE-Advanced (LTE-A) network, a base station and a UE may communicate over dedicated frequency spectrum that is licensed to the network operator. A licensed operator network (e.g., cellular network, etc.) may be known as a public land mobile network (PLMN). With increasing data traffic in cellular networks that use dedicated (e.g., licensed) radio frequency bands, offloading at least some data traffic to unlicensed or shared radio frequency spectrum may enhance data transmission capacity and efficient use of resources. Unlicensed and shared radio frequency spectrum may also provide service in areas where access to a dedicated radio frequency spectrum is unavailable. Unlicensed spectrum generally refers to spectrum available for use without a license and is typically subject to technical rules regarding access and transmitted power. Shared spectrum generally refers to spectrum that is licensed to one or more operators but follows some device coexistence procedures (e.g., a licensed radio frequency spectrum band having more than one licensed operator, a licensed radio frequency spectrum band having a prioritized operator but providing for opportunistic sharing of resources, etc.).

A listen before talk (LBT) procedure may be used for contention resolution for access to shared frequency resources of licensed or shared frequency spectrum without pre-coordinated resource allocation. An LBT procedure may include performing a clear channel assessment (CCA) procedure to determine whether a shared channel is available. When it is determined that the shared channel is available, a device may transmit a signal to reserve the channel before data transmissions. Other devices may monitor for the reservation signal to detect transmissions, and may also monitor the shared channel using energy detection to determine whether the shared channel is busy or free.

Operation using LTE signal waveforms over the shared radio frequency spectrum may be called LTE-Unlicensed (LTE-U) operation, and an LTE device supporting LTE-U operation may be called an LTE-U device. Operation using LTE/LTE-A carriers in unlicensed or shared frequency spectrum may be used in a standalone operation mode where an LTE/LTE-A carrier in shared spectrum can be used as a primary cell for a UE or in a licensed assisted access (LAA) mode where a UE is configured for carrier aggregation with a primary cell in a licensed spectrum band and one or more LTE/LTE-A secondary cells in unlicensed or shared frequency spectrum.

In LTE/LTE-A networks, radio resource management (RRM) includes procedures for managing radio resources including scheduling, power control, handover, and load-balancing. RRM procedures performed by UEs include measurement and reporting of serving cells and neighbor cells for service continuity and resource management. For example, cell measurements may be used to determine when to handover UEs or for channel selection for serving cells. Because cells in unlicensed or shared frequency spectrum may be subject to LBT procedures, RRM cell measurement and reporting procedures designed for dedicated spectrum may provide insufficient information to efficiently allocate resources among unlicensed or shared frequency spectrum.

SUMMARY

Methods, systems, and devices for radio resource management (RRM) measurement and reporting for license assisted access (LAA) cells operating in unlicensed or shared frequency spectrum are described. A user equipment (UE) may receive an RRM measurement configuration including a channel occupancy parameter for measuring neighbor cells of a shared frequency band. The channel occupancy parameter may be used to determine a channel occupancy metric that may be sent to a base station for cell selection. The channel occupancy metric may include an averaged or filtered received signal strength indicator (RSSI) and may be reported for serving cells and/or intra-frequency neighbor cells. A base station may further configure a UE with an extended discovery reference signals (DRS) measurement timing configuration (DMTC). The UE may search for DRS transmissions from neighbor cells according to the extended DMTC. The UE may then report the results of the search to the serving base station.

A method of wireless communication is described. The method may include receiving, at a user equipment (UE), a radio resource management (RRM) measurement configuration for one or more frequency channels of a shared frequency band, the RRM measurement configuration comprising at least one channel occupancy measurement parameter for the one or more frequency channels, determining at least one channel occupancy metric for the one or more frequency channels according to the at least one channel occupancy measurement parameter and reporting, to a serving cell, the at least one channel occupancy metric.

An apparatus for wireless communication is described. The apparatus may include means for receiving, at a user equipment (UE), a radio resource management (RRM) measurement configuration for one or more frequency channels of a shared frequency band, the RRM measurement configuration comprising at least one channel occupancy measurement parameter for the one or more frequency channels, means for determining at least one channel occupancy metric for the one or more frequency channels according to the at least one channel occupancy measurement parameter and means for reporting, to a serving cell, the at least one channel occupancy metric.

A further apparatus is described. The apparatus may include a processor, memory in electronic communication with the processor, and instructions stored in the memory. The instructions may be operable to cause the processor to receive, at a user equipment (UE), a radio resource management (RRM) measurement configuration for one or more frequency channels of a shared frequency band, the RRM measurement configuration comprising at least one channel occupancy measurement parameter for the one or more frequency channels, determine at least one channel occupancy metric for the one or more frequency channels according to the at least one channel occupancy measurement parameter and report, to a serving cell, the at least one channel occupancy metric.

A non-transitory computer readable medium for wireless communication is described. The non-transitory computer-readable medium may include instructions to cause a processor to receive, at a user equipment (UE), a radio resource management (RRM) measurement configuration for one or more frequency channels of a shared frequency band, the RRM measurement configuration comprising at least one channel occupancy measurement parameter for the one or more frequency channels, determine at least one channel occupancy metric for the one or more frequency channels according to the at least one channel occupancy measurement parameter and report, to a serving cell, the at least one channel occupancy metric.

In some examples of the method, apparatus, or non-transitory computer-readable medium described above, the at least one channel occupancy measurement parameter comprises a received signal strength indicator (RSSI) observation period, a RSSI measurement period, a RSSI threshold, one or more filtering parameters, or combinations thereof.

In some examples of the method, apparatus, or non-transitory computer-readable medium described above, the at least one channel occupancy metric indicates a percentage of time RSSI measurements are above the RSSI threshold over the RSSI observation period. In some examples of the method, apparatus, or non-transitory computer-readable medium described above, the at least one channel occupancy metric comprises at least one of an average RSSI or a filtered RSSI over the RSSI observation period.

In some examples of the method, apparatus, or non-transitory computer-readable medium described above, the RSSI observation period comprises a consecutive number of symbols for which a Physical Layer reports measurements of RSSI. In some examples of the method, apparatus, or non-transitory computer-readable medium described above, the RSSI observation period comprises at least one RSSI measurement period.

In some examples of the method, apparatus, or non-transitory computer-readable medium described above, reporting the at least one channel occupancy metric comprises: reporting for one or more serving cells, one or more intra-frequency neighbor cells, or combinations thereof.

Some examples of the method, apparatus, or non-transitory computer-readable medium described above may further include processes, features, means, or instructions for determining the at least one channel occupancy metric comprises measuring a signal quantity for at least one neighbor frequency of a shared frequency band while concurrently communicating with a serving base station over a primary cell.

In some examples of the method, apparatus, or non-transitory computer-readable medium described above, the at least one channel occupancy metric for the one or more frequency channels is determined for a time period including one or more discovery reference signal (DRS) transmissions from a serving cell, where the determining comprises subtracting a reference signal received power (RSRP) associated with the serving cell from a measured received signal strength indicator (RSSI) for the one or more DRS transmissions.

A method of wireless communication is described. The method may include configuring, by a base station, at least one user equipment (UE) for reporting at least one channel occupancy metric for channel selection of at least one frequency channel of a shared frequency band, wherein the configuring comprises sending respective radio resource management (RRM) measurement configurations for the at least one frequency channel indicating at least one channel occupancy measurement parameter for the at least one frequency channel, receiving, from the at least one UE, the at least one channel occupancy metric determined according to the respective RRM measurement configurations and identifying a frequency channel for a secondary cell of the base station based at least in part on the at least one channel occupancy metric.

An apparatus for wireless communication is described. The apparatus may include means for configuring, by a base station, at least one user equipment (UE) for reporting at least one channel occupancy metric for channel selection of at least one frequency channel of a shared frequency band, wherein the configuring comprises sending respective radio resource management (RRM) measurement configurations for the at least one frequency channel indicating at least one channel occupancy measurement parameter for the at least one frequency channel, means for receiving, from the at least one UE, the at least one channel occupancy metric determined according to the respective RRM measurement configurations and means for identifying a frequency channel for a secondary cell of the base station based at least in part on the at least one channel occupancy metric.

A further apparatus is described. The apparatus may include a processor, memory in electronic communication with the processor, and instructions stored in the memory. The instructions may be operable to cause the processor to configure, by a base station, at least one user equipment (UE) for reporting at least one channel occupancy metric for channel selection of at least one frequency channel of a shared frequency band, wherein the configuring comprises sending respective radio resource management (RRM) measurement configurations for the at least one frequency channel indicating at least one channel occupancy measurement parameter for the at least one frequency channel, receive, from the at least one UE, the at least one channel occupancy metric determined according to the respective RRM measurement configurations and identify a frequency channel for a secondary cell of the base station based at least in part on the at least one channel occupancy metric.

A non-transitory computer readable medium for wireless communication is described. The non-transitory computer-readable medium may include instructions to cause a processor to configure, by a base station, at least one user equipment (UE) for reporting at least one channel occupancy metric for channel selection of at least one frequency channel of a shared frequency band, where the configuring comprises sending respective radio resource management (RRM) measurement configurations for the at least one frequency channel indicating at least one channel occupancy measurement parameter for the at least one frequency channel, receive, from the at least one UE, the at least one channel occupancy metric determined according to the respective RRM measurement configurations and identify a frequency channel for a secondary cell of the base station based on the at least one channel occupancy metric.

In some examples of the method, apparatus, or non-transitory computer-readable medium described above, the at least one channel occupancy measurement parameter comprises a received signal strength indicator (RSSI) observation period, a RSSI measurement period, a RSSI threshold, one or more filtering parameters, or combinations thereof. In some examples of the method, apparatus, or non-transitory computer-readable medium described above, the at least one channel occupancy metric indicates a percentage of time RSSI measurements are above the RSSI threshold over the RSSI observation period.

In some examples of the method, apparatus, or non-transitory computer-readable medium described above, the at least one channel occupancy metric comprises at least one of an average RSSI or a filtered RSSI over the RSSI observation period. In some examples of the method, apparatus, or non-transitory computer-readable medium described above, the RSSI observation period comprises a consecutive number of symbols for which a Physical Layer reports measurements of RSSI.

In some examples of the method, apparatus, or non-transitory computer-readable medium described above, the RSSI observation period comprises at least one RSSI measurement period. Some examples of the method, apparatus, or non-transitory computer-readable medium described above may further include processes, features, means, or instructions for reporting the at least one channel occupancy metric comprises reporting for one or more serving cells, one or more intra-frequency neighbor cells.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
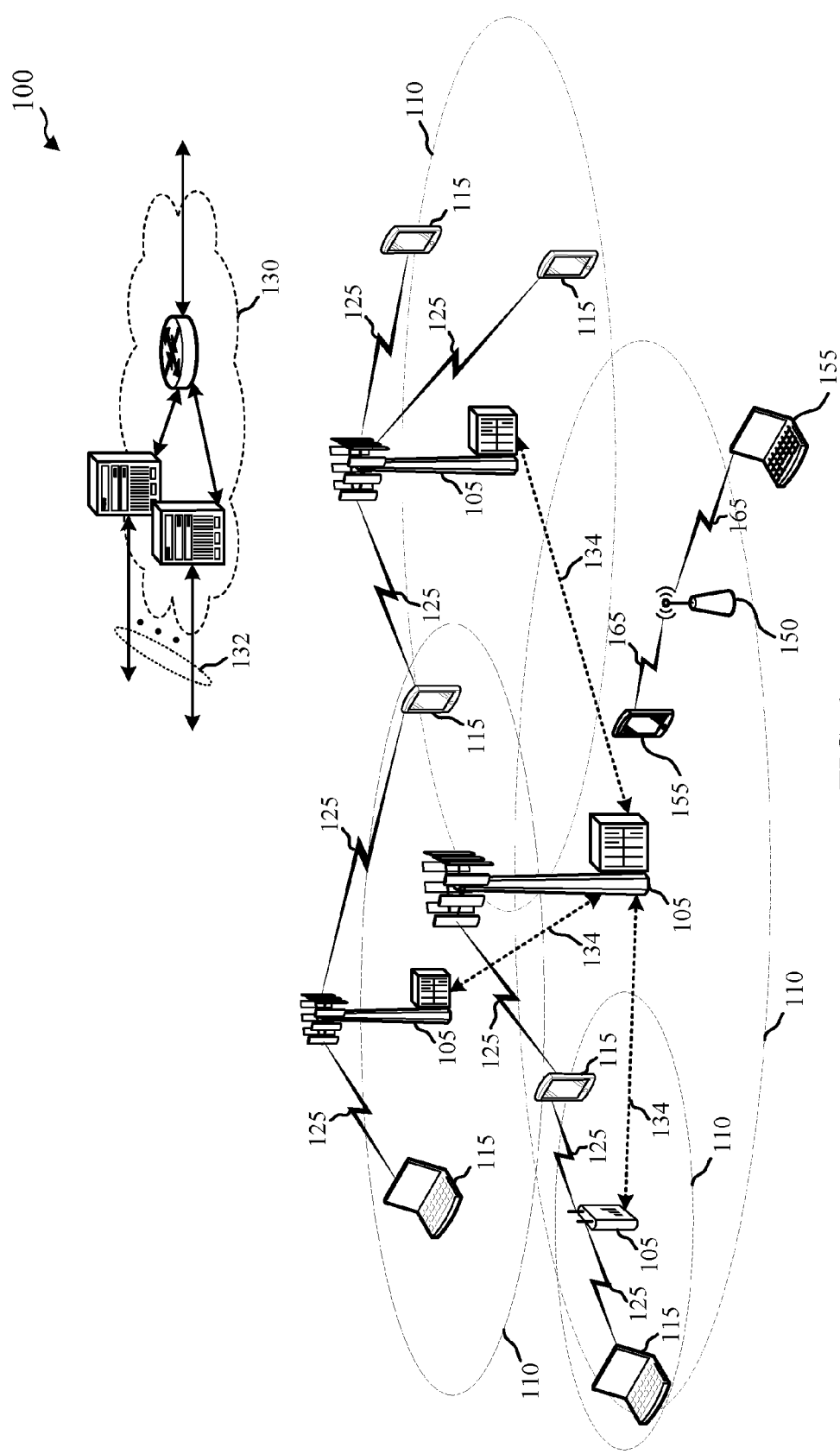
FIG. 1 illustrates an example of a wireless communications system supporting radio resource management (RRM) measurement and reporting for cells in shared spectrum in accordance with various aspects of the present disclosure.

The described features generally relate to improved systems, methods, or apparatuses for radio resource management (RRM) measurement and reporting for cells in shared frequency spectrum bands. Shared spectrum cells may be used in a carrier aggregation (CA) configuration by user equipment (UEs) configured with a primary cell (PCell) in dedicated spectrum (e.g., license assisted access (LAA), etc.). Shared spectrum cells include secondary cells (SCells) in shared spectrum configured for use by the UE. Additionally or alternatively, frequencies in shared spectrum may be associated with cells that are not currently being used for secondary cells, or not configured for use by the UE. Thus, the term shared spectrum cells should be construed broadly to include configured serving cells and frequencies associated with cells not currently configured for communication for the UE. As used herein, shared spectrum or a shared frequency spectrum band refers to spectrum that is unlicensed or shared by multiple operators (e.g., licensed to multiple operators, licensed to a prioritized operator with opportunistic sharing by other operators, etc.).

In some cases, shared spectrum bands may be, by way of regulation or agreement among device manufacturers, divided into multiple channels, where each channel may have a predefined bandwidth (e.g., 20 MHz, etc.). Before transmitting over a shared channel (e.g., channel of a shared frequency spectrum band), a base station or UE may perform CCA procedures to determine if the shared channel is available. If the base station or UE determines the channel is available, it may transmit a preamble signal to reserve the channel. Other devices may detect the preamble or transmission and back off from transmitting over the channel until the channel is clear. Such procedures may be called listen before talk (LBT) procedures. Channel selection generally refers to procedures for identifying channels for use in communication in shared frequency spectrum bands.

RRM measurements for configured SCells in shared spectrum are primarily based on DRS which occur (subject to LBT) in configured positions within a DRS measurement timing configuration (DMTC) window that is configured (e.g., relative to frame timing of a PCell in a licensed frequency spectrum band). For an activated serving cell, DRS measurements may possibly be combined with other reference signals (RS) (e.g., demodulation reference signals (DMRS), cell-specific reference signals (CRS), channel state information reference signals (CSI-RS), etc.) during a data burst received by the UE.

Techniques for improving channel selection utilizing a measurement event configured to be triggered when a frequency f1 becomes an offset better than a frequency f2 are described. The frequencies f1 and f2 configured for the measurement event may be associated with configured SCells, candidate cells in shared spectrum, or other frequency channels. Inter-frequency event triggering for shared spectrum cells may allow the eNB to improve channel selection for UEs utilizing shared spectrum cells.

Techniques for inter-frequency and intra-frequency neighbor cell measurement and reporting for shared spectrum are described. In some examples, an inter-frequency measurement gap may be applied to one or more configured LAA SCells (e.g., without impacting non-LAA cells). The measurement gap may be performed autonomously, performed on a best-effort basis (e.g., during known data burst gaps, etc.), or configured by the serving eNB. Searching for intra-frequency neighbor cells may be performed during a DMTC window that may be configured according to a search period or a window duration. An extended DMTC window may be configured to expand the search window at certain intervals. The extended DMTC window may be configured to be performed on a periodic basis, or may be performed upon receiving a request from the serving eNB.

Techniques for configuration for reporting an indication of received power (e.g., received signal strength indicator (RSSI), etc.) for cells in shared spectrum are described. RSSI reporting may be configured according to an RSSI observation period, RSSI measurement period, or RSSI threshold. RSSI reporting may include reporting average or filtered (e.g., infinite impulse response (IIR) filtered, etc.) RSSI or an RSSI profile (e.g., channel occupancy) that may indicate a number or percentage of RSSI measurements that were above the RSSI threshold for the RSSI observation period.

Techniques for enhanced reporting for neighbor cells in shared spectrum are described. In some examples, reporting for neighbor cells may be based on a downlink timing offset detected for the neighbor cells. For example, the detected timing offset may be reported for the neighbor cells, or neighbor cells may be grouped according to timing offset. The grouping may be based on the detected timing offset from the PCell and a configured timing offset threshold, or neighbor cells may be grouped according to relative timing offsets to primary component carriers (e.g., candidate PCells in dedicated spectrum, etc.). The described reporting techniques may assist in identifying cells in shared spectrum that may be co-located or from the same deployment (e.g., associated with the same public land mobile network (PLMN), etc.).

Aspects of the disclosure are initially described in the context of a wireless communication system. Specific examples are then described for LTE/LTE-A systems operating using cells in shared frequency spectrum (e.g., in LAA operation, etc.). These and other aspects of the disclosure are further illustrated by and described with reference to apparatus diagrams, system diagrams, and flowcharts that relate to RRM measurement and reporting for cells in shared spectrum.

FIG. 1 illustrates an example of a wireless communications system 100 supporting RRM measurement and reporting for cells in shared spectrum in accordance with various aspects of the present disclosure. The wireless communications system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. The wireless communications system 100 may include base stations 105 of different types (e.g., macro or small cell base stations). There may be overlapping geographic coverage areas 110 for different technologies. The communication links 125 shown in wireless communications system 100 may include uplink (UL) transmissions from a UE 115 to a base station 105, or downlink (DL) transmissions, from a base station 105 to a UE 115.

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the internet protocol (IP). A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

In some examples, the wireless communications system 100 is an LTE/LTE-Advanced (LTE-A) network. In LTE/LTE-A networks, the term evolved node B (eNB) may be generally used to describe the base stations 105, while the term UE may be generally used to describe the UEs 115. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in the central 62 and 72 subcarriers of a carrier, respectively. In some cases, PSS, SSS, and other signals such as CRS for channel estimation may be configured according to a reduced periodicity transmission schedule to conserve energy or reduce inter-cell interference. Such a configuration may be known as a DRS configuration.

In some cases, a wireless communications network 100 may include small cells whose coverage areas 110 may overlap the coverage area 110 of one or more macro base stations 105. In some cases, small cells may be added in areas with high user demand or in areas not sufficiently covered by a macro base station 105. For example, a small cell may be located in a shopping center, or in an area where signal transmissions are blocked by terrain or buildings. In some cases, small cells may improve network performance by allowing macro base stations 105 to offload traffic when load is high. A network that includes both large and small cells may be known as a heterogeneous network. A heterogeneous network may also include Home evolved node B (HeNBs) which may provide service to a restricted group known as a closed subscriber group (CSG). For example, an office building may contain small cells for use only by the occupants of the building. In some cases, heterogeneous networks may involve more complex network planning and interference mitigation techniques than homogenous networks.

Wireless communications system 100 may support operation on multiple cells or carriers, a feature which may be referred to as CA or multi-carrier operation. A carrier may also be referred to as a component carrier (CC), a layer, a channel, etc. The term "component carrier" may refer to each of the multiple carriers utilized by a UE in CA operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the Long Term Evolution (LTE) standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for CA. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. A UE 115 may be configured with multiple DL CCs and one or more UL CCs for CA. CA may be used with both frequency division duplexing (FDD) and time division duplexing (TDD) component carriers.

Each cell of a base station 105 includes a CC that may be a DL CC or a TDD CC. The cell may include an UL CC in FDD operation. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a PCell. PCells may be semi-statically configured by higher layers (e.g., RRC, etc.) on a per-UE basis. Certain uplink control information (UCI), e.g., acknowledgement (ACK)/negative-acknowledgement (NACK), channel quality indicator (CQI), and scheduling information transmitted on physical uplink control channel (PUCCH), are carried by the PCell. Additional carriers may be designated as secondary carriers, or secondary component carriers (SCC), which may be served by SCells. SCells may likewise be semi-statically configured on a per-UE basis. In some cases, SCells may not include or be configured to transmit the same control information as the PCell. In other cases, one or more SCells may be designated to carry PUCCH, and the SCells may be organized into PUCCH groups based on which CC is used to carry the associated UL control information. Some wireless networks may utilize enhanced CA operations based on a large number of carriers (e.g., between 5 and 32 carriers), operation in shared spectrum, or use of enhanced CCs.

In some cases, configured SCells are activated and deactivated for individual UEs 115 by a configuring cell using a primary carrier (e.g., PCell, etc.). For example, activation and deactivation commands for configured SCells may be carried in MAC signaling. When an SCell is deactivated, the UE 115 does not need to monitor for control information for the SCell, does not need to receive the corresponding DL CC, cannot transmit in the corresponding UL CC, nor is it required to perform CQI measurements. Upon deactivation of an SCell, the UE may also flush all HARQ buffers associated with the SCell. Conversely, when an SCell is active, the UE 115 receives control information and/or data transmissions for the SCell, and is expected to be able to perform CQI measurements. The activation/deactivation mechanism is based on the combination of a MAC control element and deactivation timers. The MAC control element carries a bitmap for the individual activation and deactivation of SCells such that SCells can be activated and deactivated individually, and a single activation/deactivation command can activate/deactivate a subset of the SCells. One deactivation timer is maintained per SCell but one common value is configured per UE by RRC.

In some examples, UEs 115 may be configured for CA using a PCell in dedicated spectrum and one or more SCells in shared spectrum. Other devices may also be operating in the shared spectrum. By way of example, FIG. 1 shows a network comprised of a Wi-Fi access point (AP) 150 in communication with Wi-Fi stations (STAs) 155 via communication links 165 in shared spectrum. UEs 115 or eNBs 105 may utilize LBT procedures for transmissions in the shared spectrum. These devices may perform a CCA prior to communicating in order to determine whether the channel is available. A CCA may include energy detection and preamble detection procedures to determine whether there are any other active transmissions.

Figure 2:
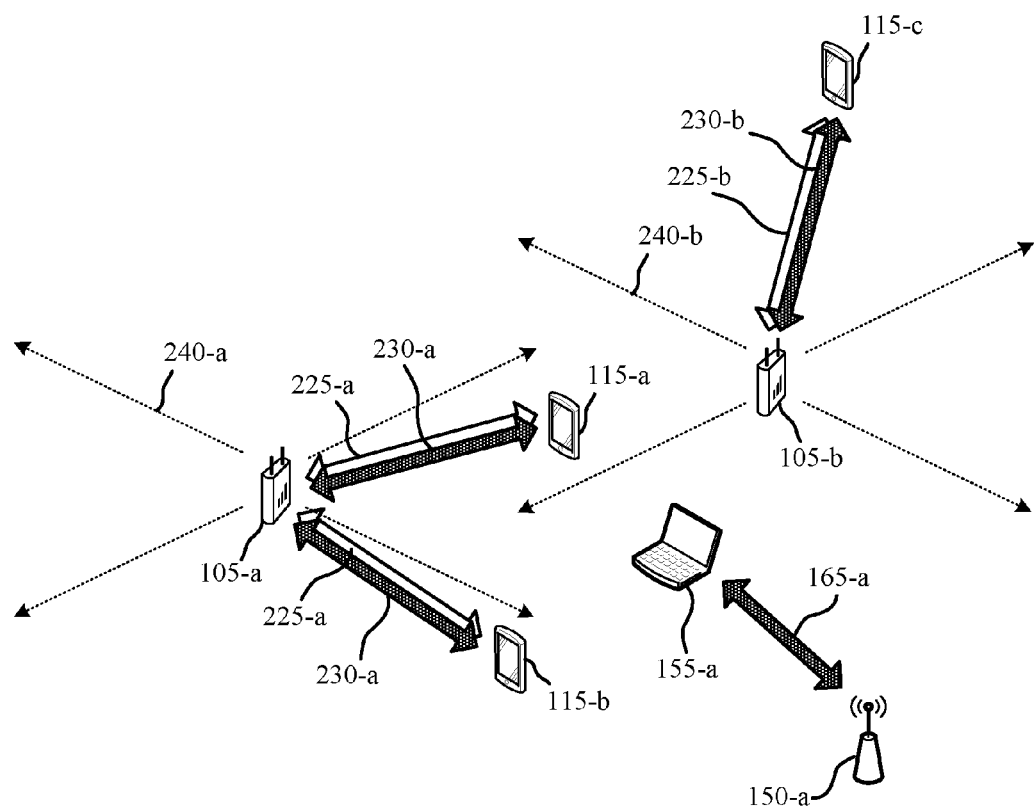
FIG. 2 illustrates an example of a wireless communication environment in which various aspects of RRM measurement and reporting for cells in shared spectrum may be employed.

FIG. 2 illustrates an example of a wireless communication environment 200 in which various aspects of the present disclosure may be employed. Wireless communications environment 200 may include eNB 105-a and eNB 105-b, which may be small cell eNBs capable of communication with UEs 115 using one or more carriers in dedicated spectrum (e.g., licensed spectrum) and one or more secondary carriers in shared spectrum. Wireless communications environment 200 may also include other devices operating over the shared spectrum, such as Wi-Fi access point 150-a and STA 155-a, which may communicate over Wi-Fi communication link 165-a in the shared spectrum. Wireless communications environment 200 may illustrate, for example, aspects of wireless communication system 100 of FIG. 1. In the interests of clarity, the described systems and techniques are discussed for cells operating in shared spectrum. However, it should be understood that the described techniques are applicable to other spectrum environments for which LBT procedures and access without pre-coordination creates interference profiles that may create challenges for traditional dedicated spectrum RRM procedures.

As illustrated in FIG. 2, UE 115-a may be in communication with eNB 105-a and may be configured by eNB 105-a for CA using a PCell 225-a in the dedicated spectrum and an SCell 230-a in the shared spectrum. The SCell 230-a may be a shared spectrum cell and may have a DRS configuration for DRS transmissions 240-a. The eNB 105-a may be the serving eNB for additional UEs 115 such as UE 115-b. Similarly, eNB 105-b may be in communication with UE 115-c via PCell 225-b and SCell 230-b, which may be configured for LAA on the same frequency or a different frequency as SCell 230-a. SCell 230-b may have a DRS configuration for DRS transmissions 240-b. In some examples, eNBs 105-a and 105-b may support additional cells in the shared frequency band for use in LAA (e.g., on other frequencies, etc.), which may each be associated with a DRS configuration. The techniques described herein may be applied to deployments using a PCell in dedicated spectrum and any number of cells in unlicensed or shared spectrum supported by one or more eNBs 105.

UE 115-a may be configured with a DMTC window for measurement of DRS transmissions on SCell 230-a. When SCell 230-a is deactivated, UE 115-a monitors for DRS transmissions during the DMTC window at DRS time positions configured by the DRS configuration for SCell 230-a (subject to LBT). When SCell 230-a is activated, UE 115-a monitors for DRS transmissions during the DMTC window, and may also use other reference signals (e.g., DMRS, CRS, CSI-RS, etc.) present in data transmissions from the eNB 105-a.

Because DRS transmissions 240-a for SCell 230-a and DRS transmissions 240-b for SCell 230-b may have different DRS configurations, UE 115-a may not be aware of SCell 230-b, or able to provide RRM measurements for SCell 230-b for RRM procedures (e.g., handover, etc.). In addition, eNBs 105-a and 105-b may support additional SCells 230, which may operate according to LAA over different frequencies of one or more shared frequency bands. Thus, UE 115-a may not provide sufficient RRM measurement information for effective RRM of the resources of wireless communication environment 200 including the shared spectrum.

The systems of FIGS. 1 and 2, including the eNBs 105 or UEs 115, may be configured for enhanced RRM measurements and reporting to assist in RRM for LAA deployments. RRM measurement and reporting enhancements include reporting event triggering based on comparative received signal strength/quality or received power between cells. Neighbor cell RRM measurements may be improved by searching over the DMTC window or an extended DMTC window for intra-frequency cell measurements or an SCell measurement gap for inter-frequency cell measurements. RRM reporting for cells in shared spectrum may be improved by reporting neighbor cells according to timing offsets of the neighbor cells relative to the PCell or other PCC candidate cells. RRM reporting may also be improved by reporting received power (e.g., RSSI, etc.) for configured SCells or SCC candidates. Received power may be reported over an observation period and may indicate interference profiles for the reported frequencies.

Figure 3:
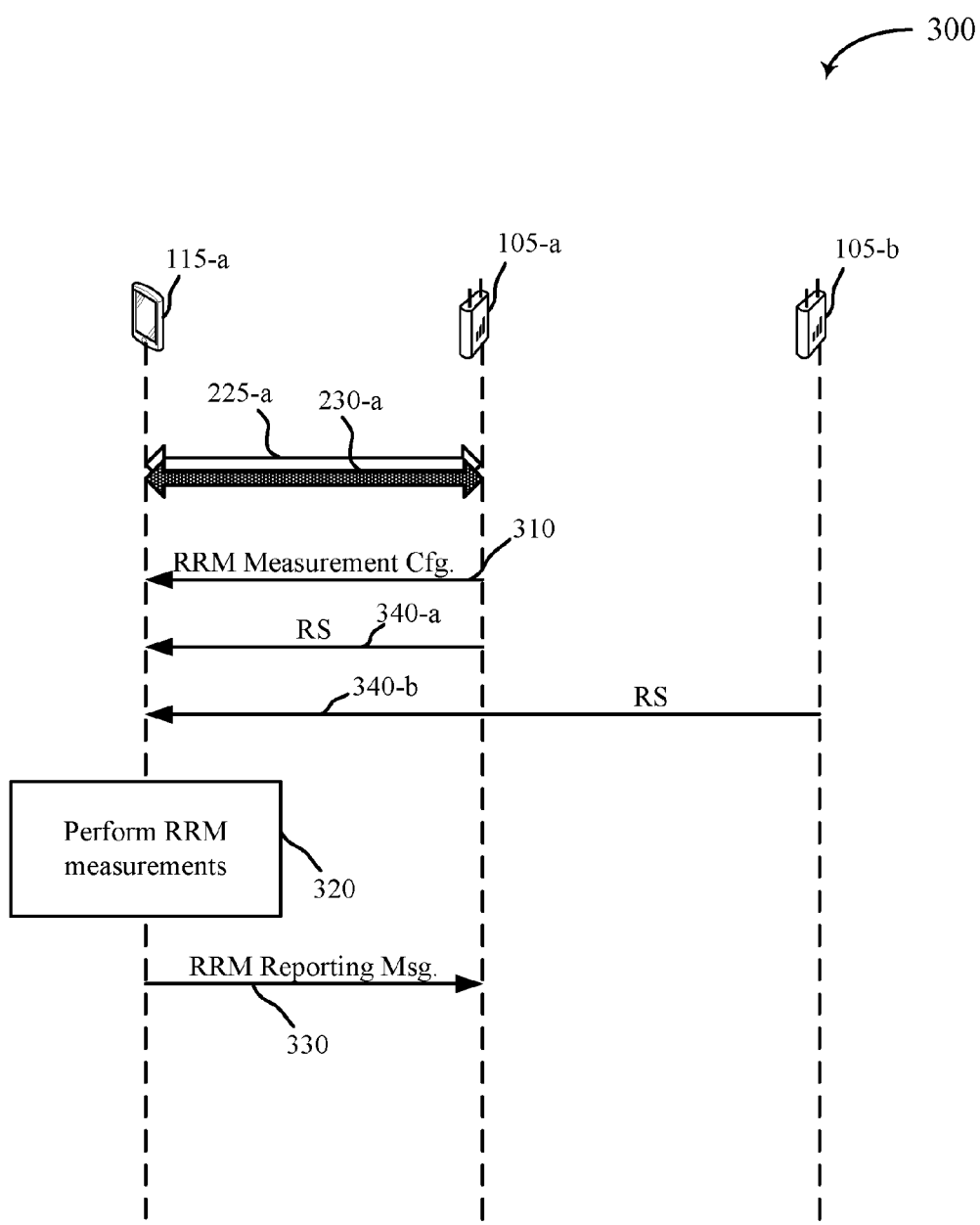
FIG. 3 shows a flow diagram illustrating enhancements for RRM measurement and reporting for cells in shared spectrum in accordance with various aspects of the disclosure.

FIG. 3 shows a flow diagram 300 illustrating enhancements for RRM measurement and reporting for cells in shared spectrum in accordance with various aspects of the disclosure. In flow diagram 300, UE 115-a may be served by eNB 105-a and may be configured by eNB 105-a for CA using PCell 225-a in dedicated spectrum and SCell 230-a in shared spectrum. For example, flow diagram 300 may illustrate example message and signal flow in wireless communication environment 200 of FIG. 2.

The UE 115-a may receive an RRM measurement configuration 310 from the eNB 105-a, which may include configuration settings or parameters for RRM measurement for one or more frequencies of a shared frequency band.

RRM measurement configuration 310 may configure an example RRM measurement event (e.g., new event A7) associated with a first cell or frequency and a second cell or frequency of the shared spectrum. The RRM measurement event may be triggered when the first cell or frequency becomes greater than an offset plus the second cell or frequency. The RRM measurement event may be configured for either or both of configured SCells or candidate SCCs. The RRM measurement event may be configured for comparison of reference signal quantities (e.g., reference signal received power (RSRP), reference signal received quality (RSRQ), etc.) or received power (e.g., RSSI, etc.).

A DMTC window or an extended DMTC window for intra-frequency RRM measurements may be configured by RRM measurement configuration 310. The DMTC window or extended DMTC window may be configured using a search period and a window duration. The extended DMTC search period may be given as an integer number of DMTC periods. The DMTC window or extended DMTC window may be configured to enable searching for DRS throughout the DMTC window or extended DMTC window (e.g., continuous monitoring for DRS over the configured window).

RRM measurement configuration 310 may indicate a measurement gap for inter-frequency RRM measurements. The measurement gap may apply to a subset of configured cells, without impacting other configured cells (e.g., PCell, etc.). For example, the measurement gap may apply to configured SCells in a given frequency band.

Reporting modes and timing offset thresholds for reporting and grouping synchronous or asynchronous neighbor cells in shared spectrum may be indicated by RRM measurement configuration 310. The reporting modes include whether to report synchronous cells (e.g., within the timing offset threshold, etc.), asynchronous cells, both synchronous and asynchronous cells, whether to group cells according to timing offset, or whether to report the detected timing offset for neighbor cells.

RRM measurement configuration 310 may configure received signal strength reporting for cells in shared spectrum. Configuration of received signal strength reporting may include configuring observation or measurement periods for measuring received power on cells in shared spectrum (e.g., configured SCells and candidate SCCs). For example, the configuration for received signal strength reporting may include an RSSI observation period, an RSSI measurement period, an RSSI threshold, or filtering parameters. The configuration may indicate reporting of an interference profile or channel occupancy (e.g., percentage of time RSSI measurements are above the RSSI threshold, etc.).

The eNB 105-a may transmit reference signals 340-a, which may include DRS transmissions (e.g., DRS transmissions 240-a) as well as other reference signals (e.g., DMRS, CRS, CSI-RS, etc.) sent with data transmissions. Similarly, eNB 105-b may transmit reference signals 340-b.

The UE 115-a may perform RRM measurements 320 based on the RRM measurement configuration 310. For example, the UE 115-a may perform RRM measurements for serving cells, RRM measurements for intra-frequency neighbor cells (e.g., according to a DMTC window or extended DMTC window), RRM measurements for inter-frequency neighbor cells (e.g., according to a measurement gap), or RSSI measurements. The UE 115-a may determine if configured measurement events are triggered based on the RRM measurements.

The UE 115-a may send a RRM reporting message 330 to the eNB 105-a based on the RRM measurements. For example, the UE 115-a may report measurements for intra-frequency and inter-frequency neighbor cells, and may report the neighbor cells according to a reporting mode (e.g., according to timing offset, etc.).

Figure 4A:
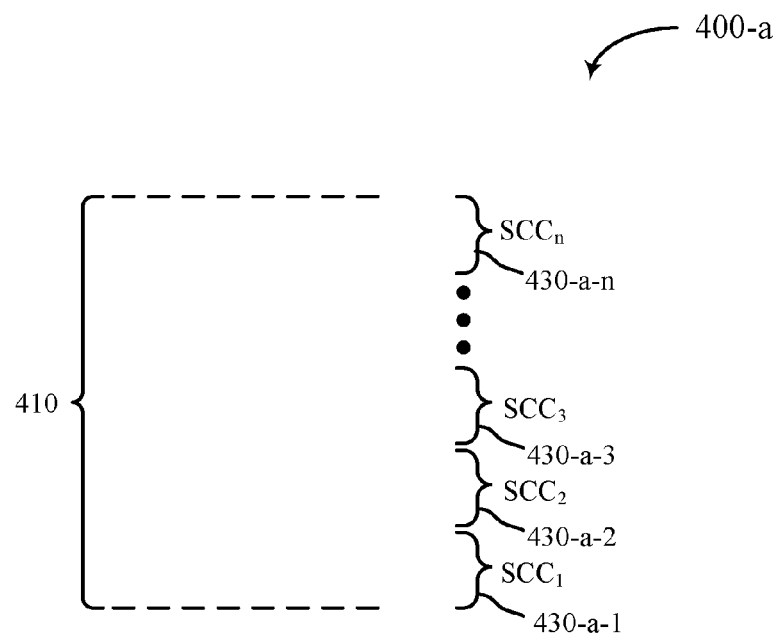
FIGS. 4A and 4B show example diagrams illustrating an inter-frequency RRM reporting event triggering for cells in shared spectrum in accordance with various aspects of the present disclosure.
Figure 4B:
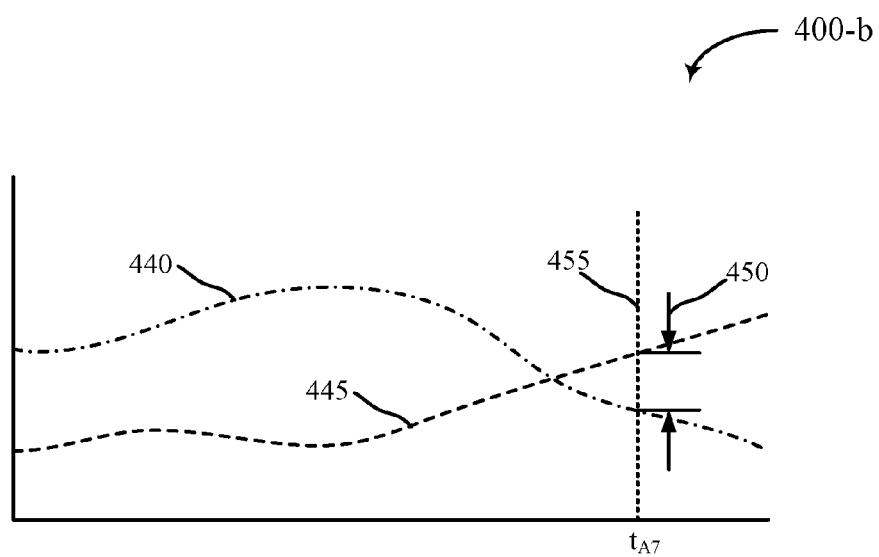

FIGS. 4A and 4B show example diagrams illustrating an inter-frequency RRM reporting event triggering for cells in shared spectrum in accordance with various aspects of the present disclosure. FIG. 4A shows an example diagram 400-a of cells 430-a-1, 430-a-2, 430-a-3, . . . , 430-a-n of a shared spectrum band 410. Each cell 430 may be used by one or more SCCs (e.g., intra-frequency neighbor cells, etc.). Inter-frequency RRM reporting may be configured for a UE 115 and may include an inter-frequency reporting event (e.g., new event A7, etc.) triggered by a signal quantity associated with a first cell becoming better than the signal quantity for a second cell. The first and second cells may correspond to configured SCells for the UE 115, or one or more of the first and second cells may be a candidate SCC that is not currently configured as an SCell for the UE 115, or another frequency (e.g., a different frequency channel of the shared frequency band 410 or a different frequency band). For example, new event A7 may be configured to be triggered when a signal quantity (e.g., RSRP, RSRQ, RSSI, etc.) for a candidate SCC at a frequency $f_1$ becomes better than a configured SCell at a frequency $f_2$. The RRM reporting event may be triggered when:

$$\text{Meas}_{f1}+O_{f1}-\text{Hyst}>\text{Meas}_{f2}+O_{f2}+\text{Offset}$$

Where $\text{Meas}_{f1}$ and $\text{Meas}_{f2}$ are the measured signal quantity values, $O_{f1}$ and $O_{f2}$ are cell-specific offsets, Hyst is a configured hysteresis value, and Offset is a configured offset for the reporting event. Filtering may be applied to the compared signal quantities $\text{Meas}_{f1}$ and $\text{Meas}_{f2}$, in some cases.

FIG. 4B shows an example diagram 400-b of an inter-frequency RRM reporting event triggered based on a configured signal quantity. In example diagram 400-b, the RRM reporting event may be configured to be triggered 455 when a signal quantity for a first cell 445 becomes better than the signal quantity for a second cell 440 by a threshold 450 (e.g., the cell-specific offsets may be set to zero). In some cases, the first and second cells may correspond to configured SCells for the UE, candidate SCCs, or other frequencies (e.g., in shared spectrum).

The event may be triggered based on signal quantities such as RSSI, RSRP, or RSRQ. For example, to trigger the event when the first cell becomes better than the second cell based on RSSI, the measured signal quantity is configured to be RSSI, the first measured frequency is configured to correspond to the second cell, and the second measured frequency is configured to correspond to the first cell. Thus, when the RSSI for the second cell becomes greater than the RSSI for the first cell plus the offset (lower RSSI corresponding to better channel conditions), the event is triggered.

Additionally or alternatively, one event (e.g., new event A7) may be configured to use signal quantities associated with cell-specific measurements (e.g., RSRP, RSRQ, etc.) and a second event (e.g., new event A8) may be configured to use signal quantities not associated with cells (e.g., RSSI, etc.). In this instance, the second event may be triggered when the signal quantity for the second cell is less than the signal quantity for the first cell minus the threshold (e.g., the frequency for the second cell is clearer than the frequency for the first cell).

Figure 5:
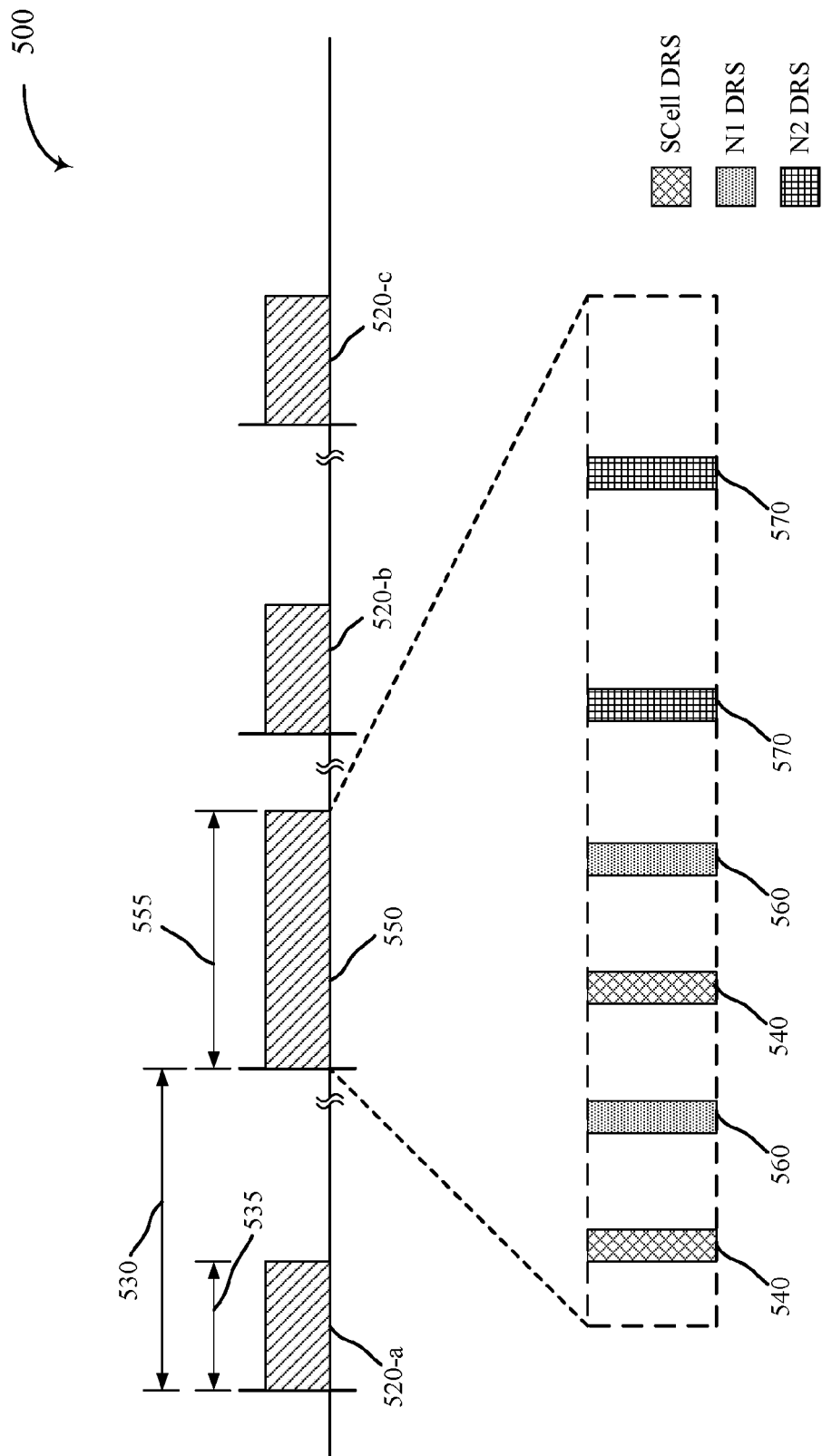
FIG. 5 shows an example diagram of discovery reference signal (DRS) measurement timing configuration (DMTC) windows for RRM measurement and reporting for cells in shared spectrum in accordance with various aspects of the present disclosure.

FIG. 5 shows an example diagram 500 of DMTC windows for RRM measurement and reporting for cells in shared spectrum in accordance with various aspects of the present disclosure. A UE 115 may be configured to search for DRS transmissions for a configured SCell during DMTC windows 520 configured according to a DMTC period 530 and a DMTC window duration 535. The configured SCell may have one or more DRS transmissions 540 that occur in configured time positions (subject to LBT) during the DMTC window 520.

The UE 115 may be configured for a DMTC window 520 or an extended DMTC window 550, during which the UE 115 may search for intra-frequency neighbor cells of shared spectrum. For example, during DMTC window 520 or extended DMTC window 550, UE 115 may detect DRS transmissions 560 from a neighbor cell N1 and DRS transmissions 570 from a neighbor cell N2.

The extended DMTC window 550 may be configured according to a search period that indicates a number of DMTC periods 530 between extended DMTC windows 550.

Thus, the UE 115 may not perform the extended DMTC window search for each DMTC window 520. The extended DMTC window 550 may also be configured according to a window duration 555, which may be configured to be as long as the DMTC period 530.

Additionally or alternatively, searching for intra-frequency neighbor cells may be performed upon a request by the eNB 105. For example, a serving eNB 105 may send a request for a neighbor cell search to be performed, and the UE may perform the search for DRS transmissions according to the request. The requested search may be performed over a duration specified in the request, or over the window duration 555, in some cases.

Figure 6:
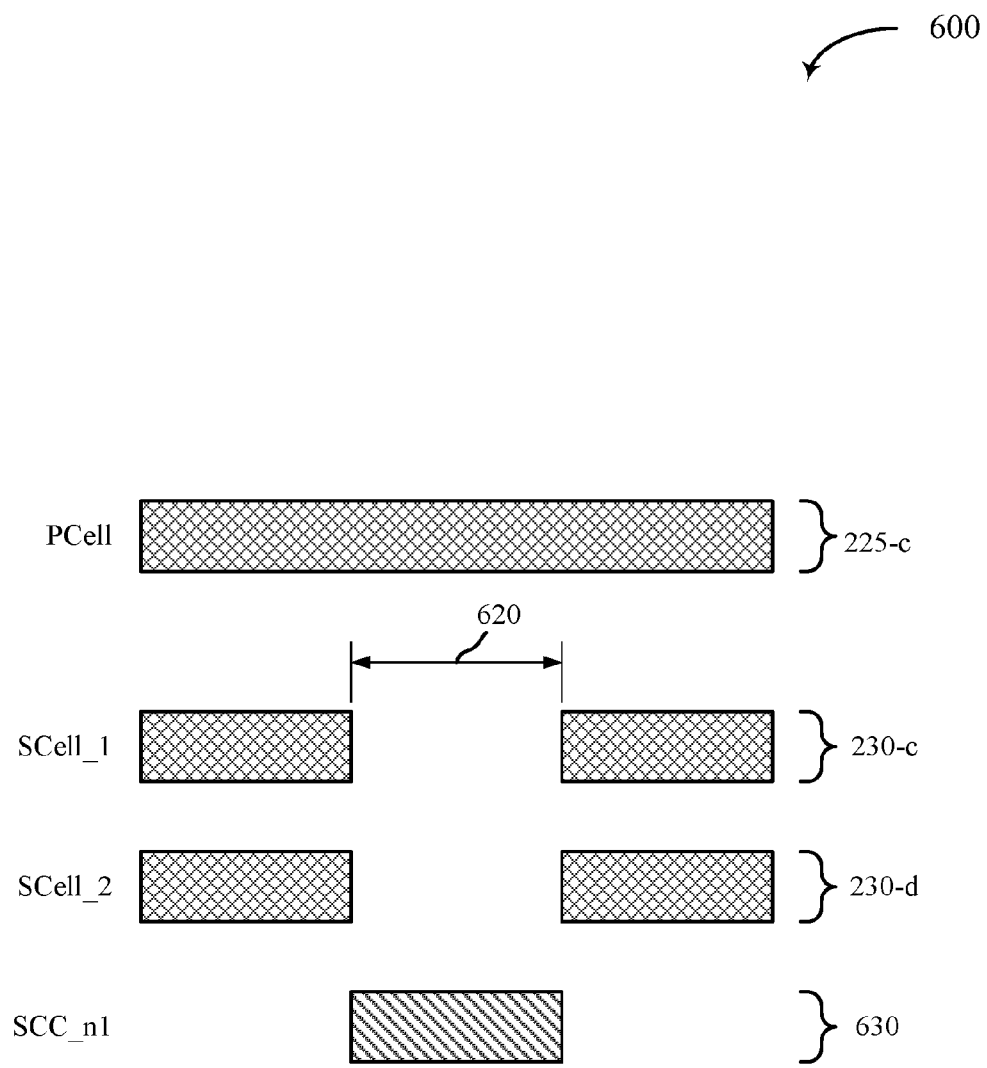
FIG. 6 shows an example diagram of measurement gaps for RRM measurement and reporting for cells in shared spectrum in accordance with various aspects of the present disclosure.

FIG. 6 shows an example diagram 600 of measurement gaps for RRM measurement and reporting for cells in shared spectrum in accordance with various aspects of the present disclosure. FIG. 6 may illustrate a measurement gap for a UE 115 configured for communication via a set of serving cells including PCell 225-c and one or more SCells including SCell_1 230-c and SCell_2 230-d. SCell_1 230-c and SCell_2 230-d may be cells in a shared frequency band.

For performing inter-frequency RRM measurements for LAA, UE 115 may employ a measurement gap 620 in which the UE 115 may perform RRM measurements (e.g., detecting DRS transmissions or other reference signal transmissions, etc.) for one or more other frequencies (e.g., SCC_n1 630, etc.). The one or more other frequencies may be in the same band as configured SCells (e.g., SCell_1 230-c and SCell_2 230-d), or may be in a different frequency band, in some cases. During the measurement gap 620, the UE 115 may suspend communications over a subset of the set of serving cells (e.g., SCell_1 230-c and SCell_2 230-d) while communicating over others of the set of serving cells (e.g., PCell 225-c). In some examples, the measurement gap 620 may be associated with a frequency band (e.g., the gap is applied to configured SCells in the frequency band). In some examples, suspending communication may include switching a radio frequency component from communication over one frequency range or band to a different frequency range or band. For example, the UE 115 may include dual radios (e.g., multiple transceiver components) and may tune one of the radios to a different frequency band or range during the measurement gap 620.

The measurement gap 620 may be an autonomous gap, may be during known data burst gaps, or may be a configured LAA measurement gap. For an autonomous gap, the UE 115 may perform the inter-frequency RRM measurements during the gap without being requested by the eNB 105 or informing the eNB 105. For example, the UE 115 may determine that the priority for inter-frequency RRM measurements is higher than the priority of possible data transmissions during the gap such that the RRM measurements should take precedence. In some cases, determining whether to perform an autonomous gap may be based on a time period since previous RRM measurements for cells in shared spectrum were taken, signal strength of one or more configured LAA SCells, or priority of active data connections.

In cases where the UE 115 is configured with a data burst configuration for one or more LAA SCells, RRM measurements may be performed during gaps in the data bursts. For example, the UE 115 may be configured with semi-persistently scheduled data bursts on one or more LAA SCells and may be able to perform a measurement gap during time periods between data bursts on the LAA SCells.

LAA measurement gaps may be configured according to parameters received in a RRM measurement configuration (e.g., RRM measurement configuration 310 of FIG. 3, etc.). For example, the UE 115 may be configured for an LAA inter-frequency measurement gap according to a measurement period and a measurement duration. The LAA inter-frequency measurement gap may apply to a subset of a serving set of cells. For example, the LAA inter-frequency measurement gap may apply to all configured LAA SCells or a subset of configured LAA SCells (e.g., within a configured frequency band, etc.).

Reporting of neighbor cells in shared spectrum may be based on detected timing offsets of the neighbor cells relative to frame timing of the PCell or other detected dedicated spectrum PCC. For example, relatively small timing offsets (e.g., less than 30 μs, etc.) between the PCell and a detected LAA SCC may indicate that the LAA SCC is likely co-located with the PCell. Larger timing offsets may indicate either an asynchronous cell of the same PLMN or a cell associated with a different PLMN.

Figure 7:
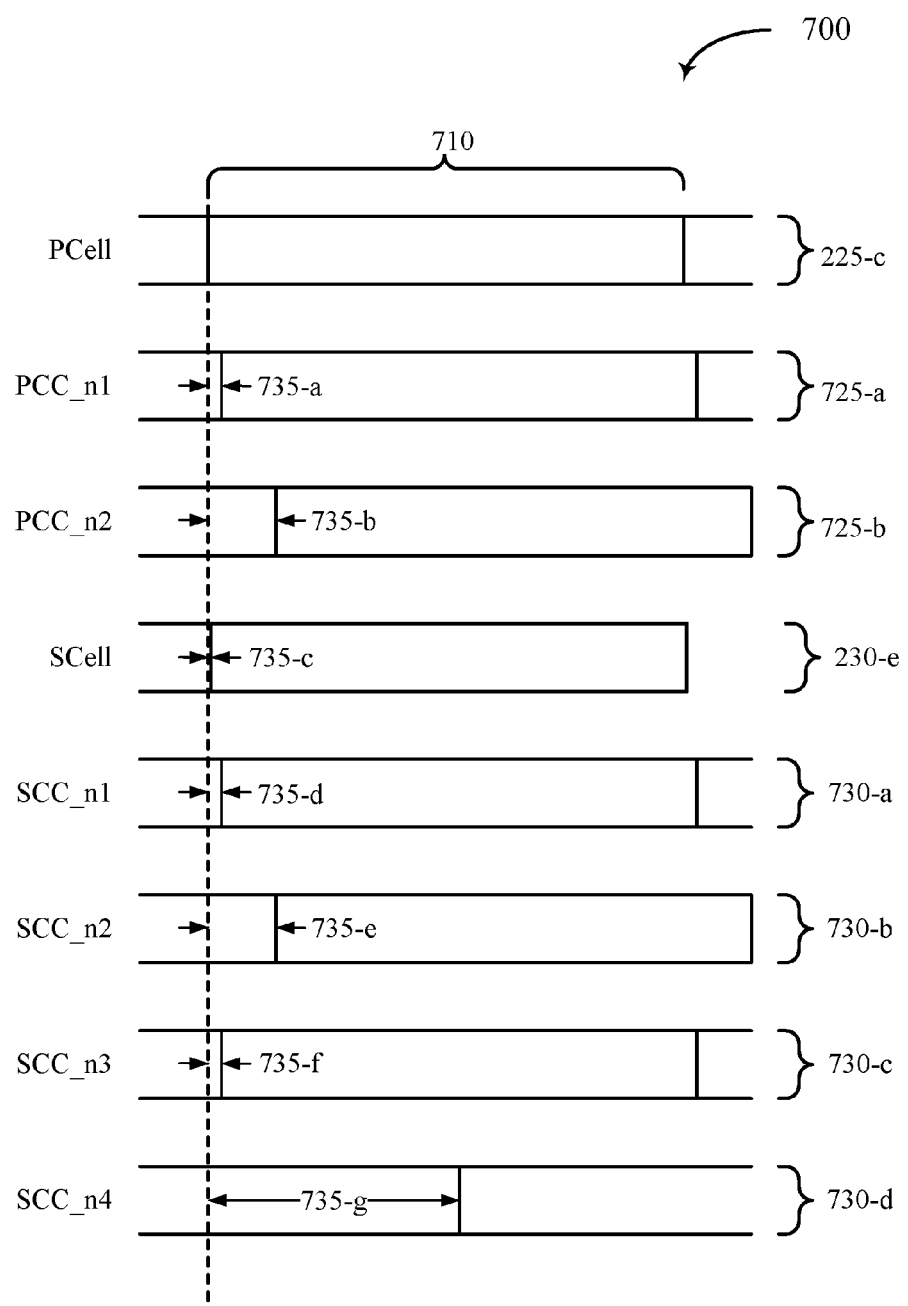
FIG. 7 shows an example diagram of detected timing offsets for cells in shared spectrum neighbor cell reporting in accordance with various aspects of the present disclosure.

FIG. 7 shows an example diagram 700 of detected timing offsets for neighbor shared spectrum cell reporting in accordance with various aspects of the present disclosure. FIG. 7 may illustrate detected timing offsets of neighbor cells for a UE 115 configured for communication via a set of serving cells including PCell 225-c and one or more SCells including SCell 230-e. SCell 230-e may be an cell in a shared frequency band. The UE 115 may perform RRM measurements for inter-frequency and intra-frequency cells according to the above techniques (e.g., measurement gaps, extended DMTC window, etc.). The UE 115 may detect timing offsets for the detected neighbor cells and may perform RRM reporting according to the detected timing offsets and a RRM reporting mode configured in a RRM measurement configuration (e.g., RRM measurement configuration 310 of FIG. 3, etc.).

In some examples, the RRM reporting mode identifies cells of shared spectrum for reporting according to the detected timing offsets and a configured timing offset threshold. For example, a timing offset threshold may be received in a RRM measurement configuration and a subset of detected cells may be reported based on the timing offset threshold. In some cases, reporting may be performed for synchronous cells or asynchronous cells only. Additionally or alternatively, both synchronous and asynchronous cells may be reported, and the report may group or identify cells by timing offset. For example, multiple timing groups may be reported, with each timing group having cells that are within an associated timing offset window.

As illustrated in FIG. 7, the UE 115 may detect PCC_n1 725-a and PCC_n2 725-b, which may be candidate PCells for the UE 115. For example, PCC_n1 725-a and PCC_n2 725-b may be intra-frequency or inter-frequency cells in dedicated spectrum associated with the same PLMN as PCell 225-c. The UE 115 may detect a frame timing offset of 735-a for PCC_n1 and 735-b for PCC_n1 and PCC_n2 relative to a frame 710 for the PCell 225-c, which may be 50 μs and 1000 μs, respectively, for the example illustrated in FIG. 7.

The UE 115 may also detect neighbor cells SCC_n1 730-a, SCC_n2 730-b, SCC_n3 730-c, and SCC_n4 730-d, which may be intra-frequency or inter-frequency cells in shared spectrum. The UE 115 may detect frame timing offsets of 735-d, 735-e, 735-f, and 735-g, for SCC_n1 730-a, SCC_n2 730-b, SCC_n3 730-c, and SCC_n4 730-d, respectively. In the example illustrated in FIG. 7, frame timing offsets 735-d, 735-e, 735-f, and 735-g may be 60 μs, 1020 μs, 500 μs, and 5000 μs, respectively. UE 115 may detect a frame timing offset of 1 μs for SCell 230-e.

In some examples, UE 115 may report identified cells for RRM in synchronous or semi-synchronous groups (e.g., cells having relative timing offsets within the timing offset threshold of each other). For example, UE 115 may report SCC_n1 730-*a* as synchronous with PCC_n1 725-*a* and SCC_n2 730-*b* as synchronous with PCC_n2 725-*b*. UE 115 may report SCC_n3 730-*c* and SCC_n4 730-*d* as asynchronous cells in shared spectrum. The grouping may indicate to a serving eNB whether the reported neighbor cells are possibly co-located or from the same deployment (e.g., same PLMN, etc.) as other cells in shared spectrum or candidate PCCs.

Figure 8:
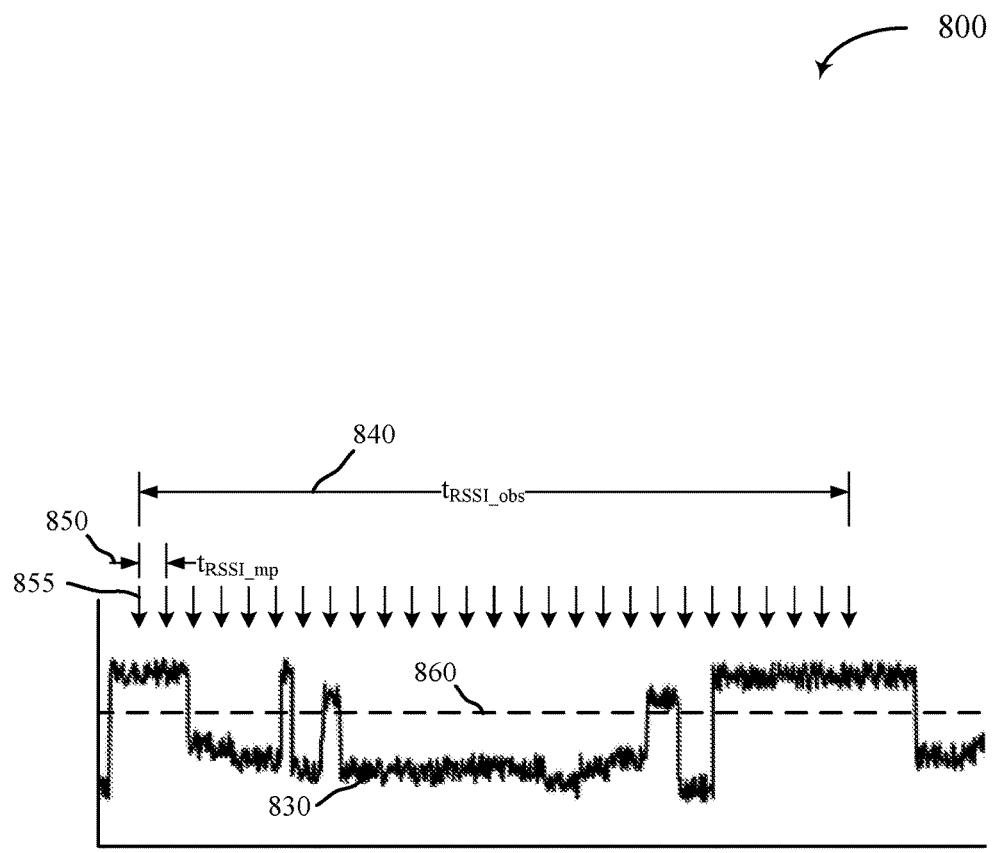
FIG. 8 shows an example diagram of received signal strength indicator (RSSI) measurements for RRM measurement and reporting for cells in shared spectrum in accordance with various aspects of the present disclosure.

FIG. 8 shows an example diagram 800 of RSSI measurements for RRM measurement and reporting for cells in shared spectrum in accordance with various aspects of the present disclosure. Diagram 800 shows a plot of RSSI 830 for an cell (e.g., SCell or candidate SCC, etc.). As can be seen from diagram 800, RSSI 830 for a cell in shared spectrum may show a bursty interference profile that is substantially different from an interference profile in dedicated spectrum.

A UE 115 may be configured (e.g., via RRM measurement configuration 310 of FIG. 3, etc.) to report RSSI for the cell according to an RSSI observation period $t_{RSSI\_obs}$ 840, an RSSI measurement period $t_{RSSI\_mp}$ 850, or an RSSI threshold 860. The UE 115 may be configured to report an average or filtered (e.g., layer-3 filtered, etc.) RSSI over the RSSI observation period $t_{RSSI\_obs}$ 840, which may be on the order of hundreds of milliseconds. Additionally or alternatively, the UE 115 may be configured to report an RSSI profile or channel occupancy, which may indicate an amount of time or percentage of RSSI measurements 855 for the cell that are above the RSSI threshold 860 for the RSSI observation period $t_{RSSI\_obs}$ 840. The RSSI profile or channel occupancy may provide a better indication of interference from other users (e.g., Wi-Fi devices, etc.) of the shared frequency channel.

The UE 115 may be configured to report RSSI for a configured SCell or an unconfigured frequency channel in the shared frequency band (e.g., candidate SCC, etc.). For a configured SCell, the UE 115 may perform measurements for RSSI reporting during time periods without DRS transmissions. This may provide for a better comparison with RSSI reported for another shared frequency channel for channel selection. Additionally or alternatively, the UE 115 may perform RSSI measurements for time periods including DRS transmissions but may subtract the RSRP from the SCell for RSSI measurement processing.

Figure 9:
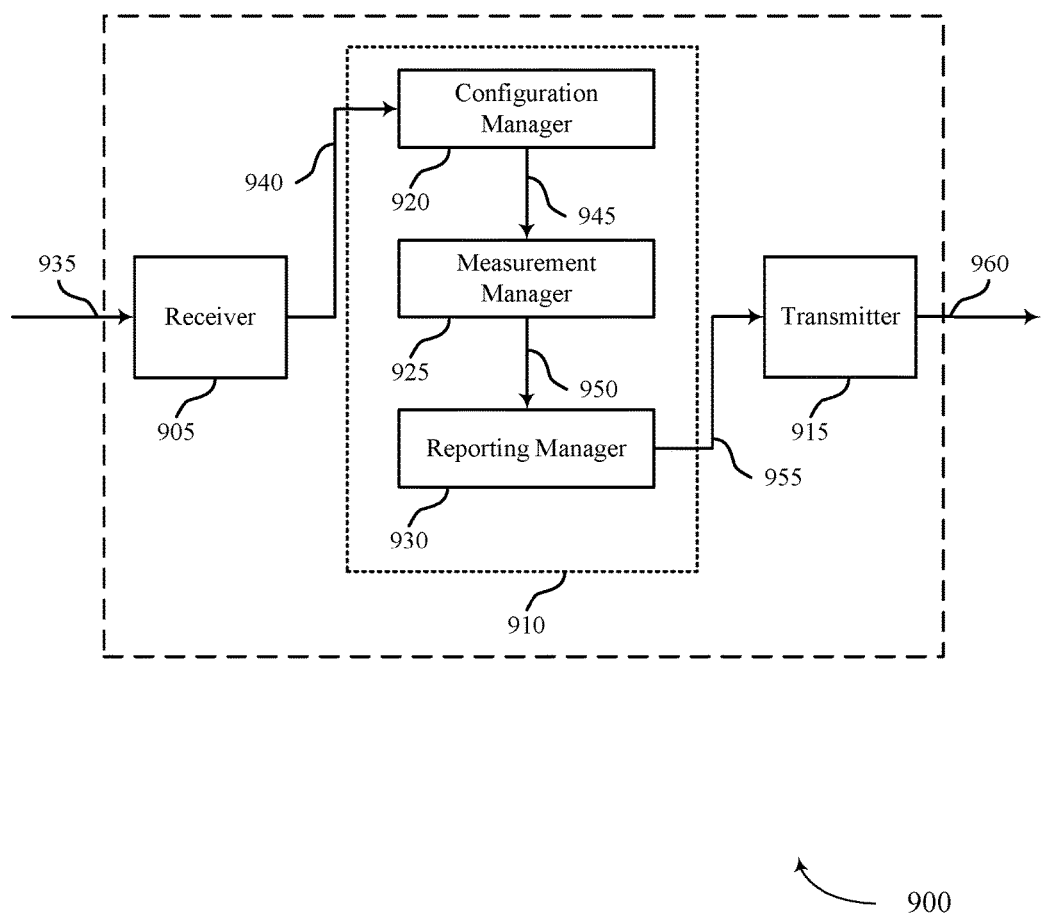
FIGS. 9-11 show block diagrams of a wireless device that supports RRM measurement and reporting for cells in shared spectrum in accordance with various aspects of the present disclosure.

FIG. 9 shows a block diagram of a wireless device 900 configured for RRM measurement and reporting for cells in shared spectrum in accordance with various aspects of the present disclosure. Wireless device 900 may be an example of aspects of a UE 115 described with reference to FIGS. 1-8. Wireless device 900 may include a receiver 905, a RRM measurement and reporting manager 910, or a transmitter 915. The RRM measurement and reporting manager 910 may include a configuration manager 920, a measurement manager 925, or a reporting manager 930. Wireless device 900 may also include a processor. Each of these components may be in communication with each other.

The receiver 905 may receive receiver information 935 such as packets, user data, or control information associated with various information channels (e.g., control channels, data channels, and information related to RRM measurement and reporting for LAA, etc.). Receiver information 935 may be passed on in a configuration message 940 to the RRM measurement and reporting manager 910, and to other components of wireless device 900. In some examples, the receiver 905 may receive, from the serving eNB, a request to perform an aperiodic search for intra-frequency cells.

An RRM measurement configuration message 940 may be passed from receiver 905 to a configuration manager 920. The configuration manager 920 may pass a measurement parameter message 945 to a measurement manager 925. The measurement parameter message 945 may include at least one parameter related to RRM measurement for one or more frequencies of a shared frequency band, and the measurement manager 925 may perform at least one measurement for the one or more frequencies based at least in part on the measurement parameter message 945. A channel parameter message 950, determined from the at least one measurement of the measurement manager 925, may then be passed to a reporting manager 930. The reporting manager 930 may then send a reporting message 955 to transmitter 915.

The transmitter 915 may signal transmission information 960 received from other components of wireless device 900. Transmission information 960 may include measurements or channel occupancy information. In some examples, the transmitter 915 may be collocated with the receiver 905 in a transceiver manager. The transmitter 915 may include a single antenna, or it may include a plurality of antennas.

Figure 10:
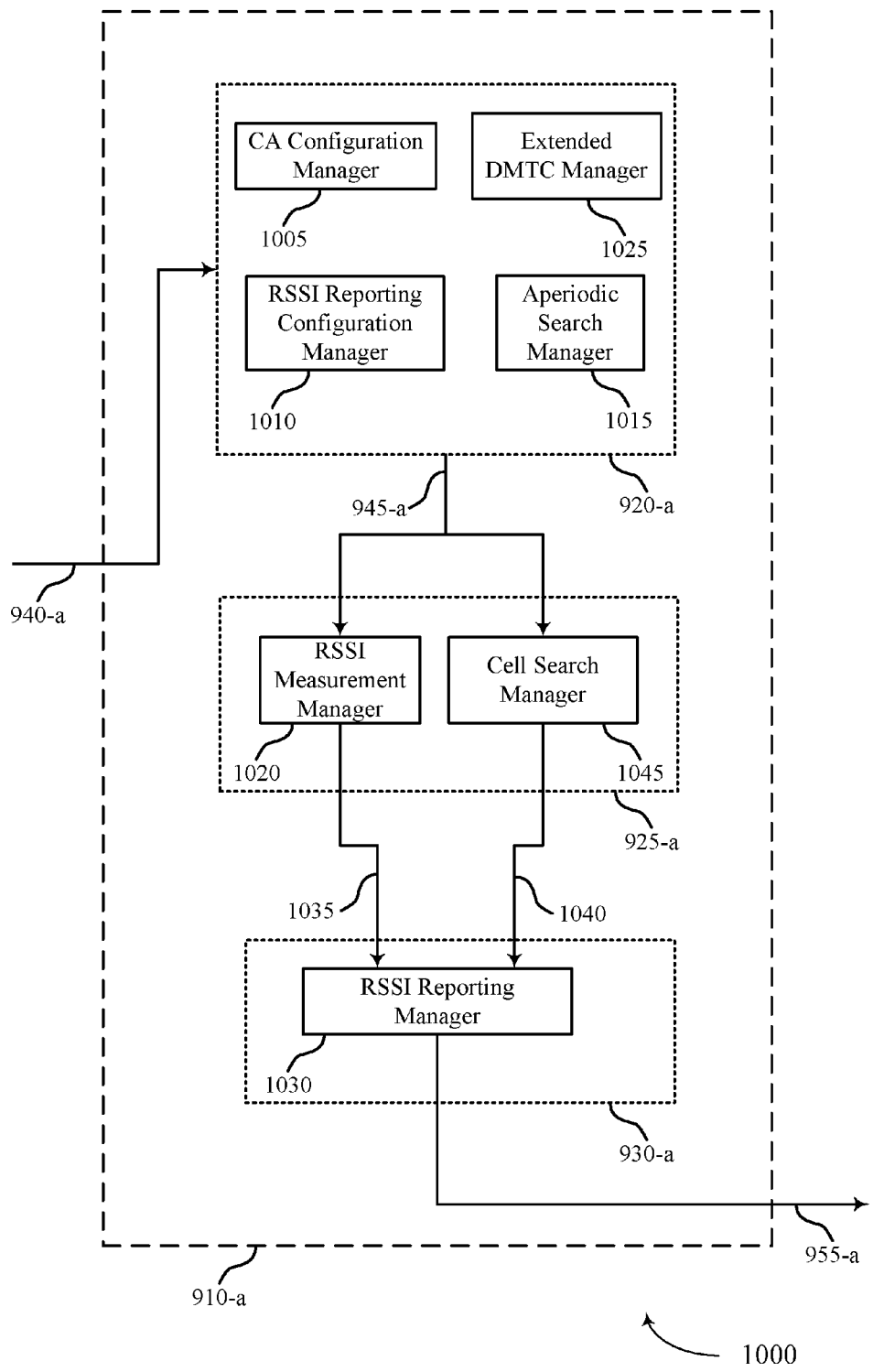

FIG. 10 shows a block diagram of a wireless device 1000 for RRM measurement and reporting for cells in shared spectrum in accordance with various aspects of the present disclosure. Wireless device 1000 may be an example of aspects of a wireless device 900 or a UE 115 described with reference to FIGS. 1-9. Wireless device 1000 may include a receiver 905 (not shown), a RRM measurement and reporting manager 910, or a transmitter 915 (not shown). Wireless device 1000 may also include a processor (not shown). Each of these components may be in communication with each other. The RRM measurement and reporting manager 910 may also include a configuration manager 920-*a*, a RRM measurement manager 925-*a*, and a reporting manager 930-*a*.

The RRM measurement and reporting manager 910-*a* may perform the operations described with reference to FIG. 9. RRM measurement and reporting manager 910-*a* may receive a configuration message 940-*a* passed from a receiver 905 of the UE 115. The RRM measurement and reporting manager 910-*a* may forward the configuration message 940-*a* to a configuration manager 920-*a*. Configuration manager 920-*a* may receive (e.g., via a receiver 905) a RRM measurement configuration from a serving eNB, the RRM measurement configuration comprising at least one parameter related to RRM measurement for one or more frequencies of a shared frequency band as described with reference to FIG. 3.

Configuration manager 920-*a* may include a CA configuration manager 1005, an RSSI reporting configuration manager 1010, an extended DMTC manager 1025, or an aperiodic search manager 1015. The CA configuration manager 1005 may be configured to manage the CA configuration for the UE. For example, the UE may be configured with a set of serving cells including a PCell in dedicated spectrum and one or more LAA SCells as described with reference to FIGS. 2-8. The RSSI reporting and configuration manager 1010 may perform the configuration of RSSI measurement at the UE and of reporting the measurement back to a base station. The aperiodic search manager 1015 may receive requests for searching for intra-frequency cells of shared spectrum and may perform the searches for the intra-frequency cells based at least in part on the request as described with reference to FIGS. 2-8.

In some examples, the configuration message 940-a comprises a configuration for a measurement event associated with a first frequency and a second frequency of the shared frequency band. In some examples, the received signal quantity comprises at least one of an RSSI, an RSRP, or an RSRQ. In some examples, at least one of the first frequency or the second frequency may be a configured SCell for the UE. In some examples, at least one of the first frequency or the second frequency may be a frequency not configured as an SCell for the UE. The measurement manager 925-a may perform measurements for the first frequency and the second frequency based on the configured measurement event.

In some examples, the measurement parameter message 945-a comprises a configuration for a DMTC window or an extended DMTC window to be sent to cell search manager 1045. In some examples, the configuration for the DMTC window or extended DMTC window comprises at least one of a search period, a window duration, or combinations thereof. The cell search manager 1045 may perform intra-frequency measurements for cells of shared spectrum based on the DMTC window or extended DMTC window. The cell search manager 1045 may, for example, search for at least one serving secondary cell DRS at a configured time position within the DMTC window and/or search for at least one neighbor cell DRS not associated with a configured time position within the DMTC window.

In some examples, the measurement parameter message 945-a comprises at least one RSSI measurement parameter associated with the one or more frequencies of the shared frequency band to be sent to RSSI measurement manager 1020. The RSSI measurement manager 1020 may perform RSSI measurements based on the at least one RSSI measurement parameter indicated in the measurement parameter message 945-a.

In other examples, the measurement parameter message 945-a comprises a configuration for an inter-frequency measurement period associated with a subset of a set of serving cells. The measurement manager 925 may measure a signal quantity for at least one neighbor frequency of the shared frequency band while concurrently communicating with the serving eNB over a PCell during the inter-frequency measurement period.

The reporting manager 930-a may include an RSSI reporting manager 1030. RSSI reporting manager 1030 may receive a RSSI message 1035 from RSSI measurement manager 1020. The RSSI measurement manager 1020 may be configured to manage configuration and reporting for RSSI measurements. For example, the RSSI measurement manager 1020 may configure RSSI measurements according to at least one RSSI measurement parameter (e.g., in measurement parameter message 945) including an RSSI observation period, an RSSI measurement period, an RSSI threshold, or combinations thereof as described with reference to FIGS. 2-8.

The reporting manager 930-a may report, to the serving eNB, a channel parameter determined from the at least one measurement as described with reference to FIGS. 2-8 (e.g., from RSSI measurement manager 1020 or cell search manager 1045). In some examples, the reporting comprises a reporting message 955-a associated with one or more neighbor cells based at least in part on detected timing offsets of the one or more neighbor cells relative to a frame timing of a PCell from the serving eNB and the timing offset threshold. In some examples, the reporting message 955-a associated with the one or more neighbor cells comprises the detected timing offsets. In some examples, the reporting message 955-a associated with the one or more neighbor cells comprises a grouping of the one or more neighbor cells according to the detected timing offsets. In some examples, the reporting message 955-a associated with the one or more neighbor cells comprises a grouping of the one or more neighbor cells with one or more candidate PCells based at least in part on the detected timing offsets. In some examples, the reporting message 955-a comprises reporting an average RSSI over the RSSI observation period. In some examples, the reporting message 955-a comprises reporting an indicator of an amount of time RSSI measurements for the one or more frequencies are above the RSSI threshold for the RSSI observation period. The reporting manager 930-a may also report information associated with one or more intra-frequency cells detected during the searching in the reporting message 955-a. The RRM measurement and reporting manager 910 may also include a RRM event triggering manager, an extended DMTC manager, a RSSI reporting configuration manager, a CA configuration manager, a measurement gap manager, and a RRM aperiodic search manager.

Figure 11:
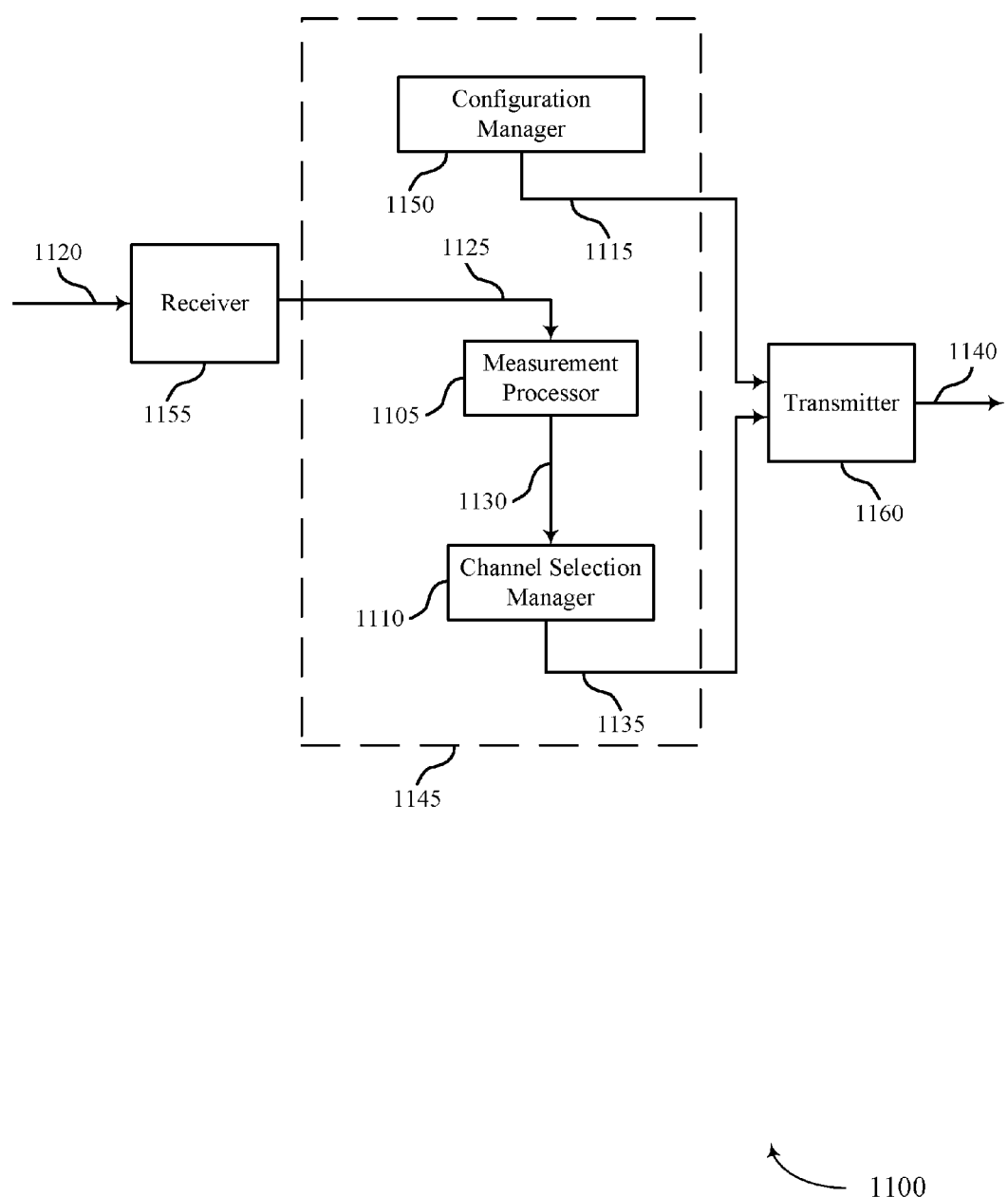

FIG. 11 shows a block diagram 1100 of a RRM measurement and configuration manager 1145 which may be a component of a base station 105 for RRM measurement and reporting for LAA in accordance with various aspects of the present disclosure. The RRM measurement and configuration manager 1145 may include a configuration manager 1150, measurement processor 1105, and a channel selection manager 1110.

The configuration manager 1150 may determine a configuration for RRM measurement and reporting for LAA for one or more UEs 115. The configuration manager 1150 may forward a configuration message 1115 to a transmitter 1160. The transmitter 1160 may transmit transmission information 1140 comprising a configuration indicated by the configuration message 1115 to a UE 115.

A receiver 1155 may receive receiver information 1120. The receiver 1155 may forward a reported measurement message 1125 to a measurement processor 1105. The measurement processor may forward a processed measurement message 1130 to a channel selection manager 1110. The channel selection manager 1110 may determine one or more frequency channels and forward a channel selection message 1135 to a transmitter 1160. The transmitter 1160 may then transmit transmission information 1140 to a UE 115.

Figure 12:
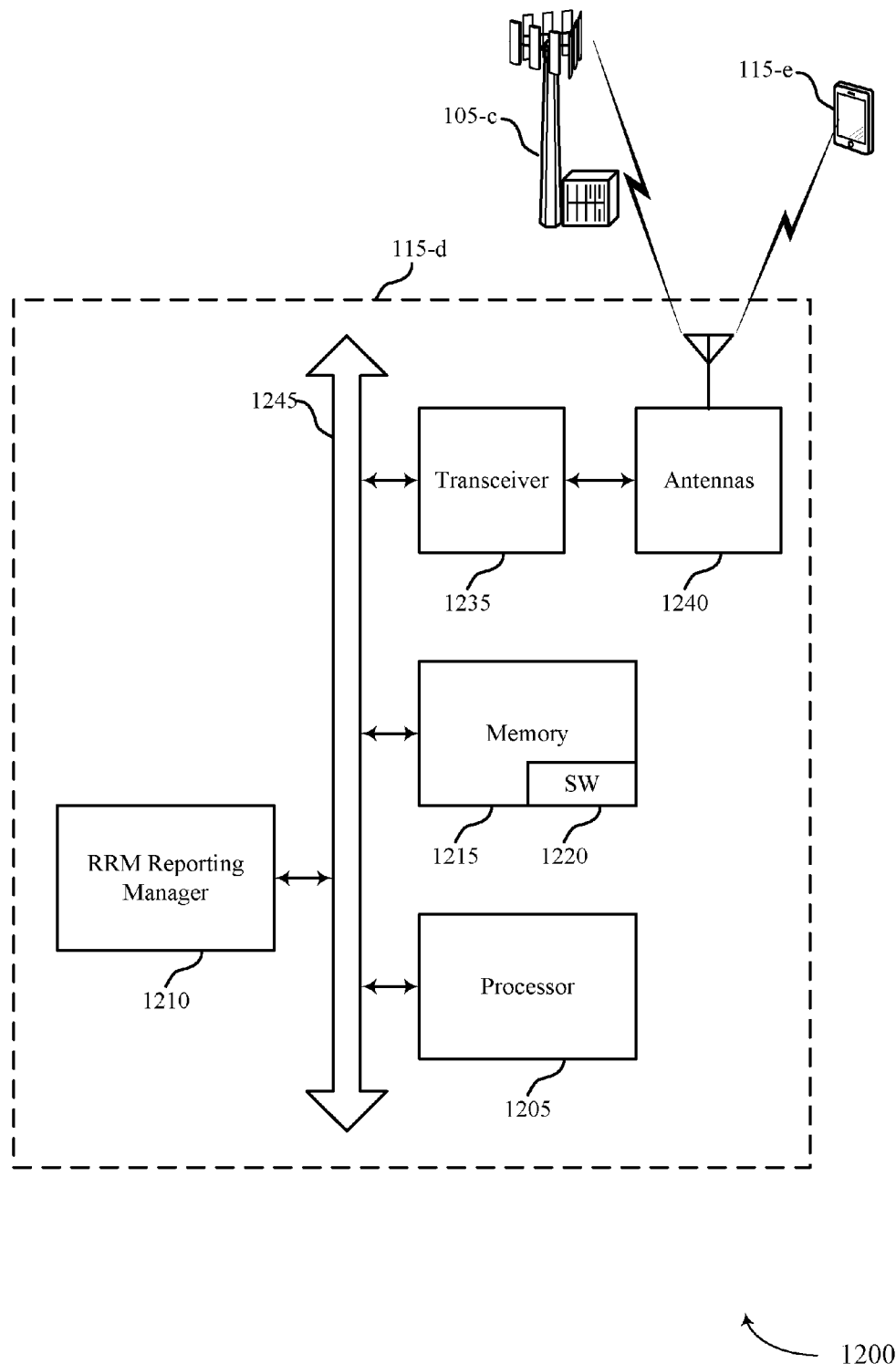
FIG. 12 illustrates a block diagram of a system including a user equipment (UE) that supports RRM measurement and reporting for cells in shared spectrum in accordance with various aspects of the present disclosure.

FIG. 12 shows a diagram of a system 1200 including a UE 115 configured for RRM measurement and reporting for cells in shared spectrum in accordance with various aspects of the present disclosure. System 1200 may include UE 115-d, which may be an example of a wireless device 900, a wireless device 1000, or a UE 115 described with reference to FIGS. 1, 2 and 9-11. UE 115-d may include a RRM reporting manager 1210, which may be an example of a RRM measurement and reporting manager 910 described with reference to FIGS. 9-11. UE 115-d may also include components for bi-directional voice and data communications including components for transmitting communications and components for receiving communications. For example, UE 115-d may communicate bi-directionally with base station 105-c or UE 115-e.

UE 115-d may also include a processor 1205, and memory 1215 (including software) 1220, a transceiver 1235, and one or more antenna(s) 1240, each of which may communicate, directly or indirectly, with one another (e.g., via buses 1245). The transceiver 1235 may communicate bi-directionally, via the antenna(s) 1240 or wired or wireless links, with one or more networks, as described above. For example, the transceiver 1235 may communicate bi-directionally with a base station 105 or another UE 115. The transceiver 1235 may include a modem to modulate the packets and provide the modulated packets to the antenna(s) 1240 for transmission, and to demodulate packets received from the antenna(s) 1240. While UE 115-*d* may include a single antenna 1240, UE 115-*d* may also have multiple antennas 1240 capable of concurrently transmitting or receiving multiple wireless transmissions.

The memory 1215 may include random access memory (RAM) and read only memory (ROM). The memory 1215 may store computer-readable, computer-executable software/firmware code 1220 including instructions that, when executed, cause the processor 1205 to perform various functions described herein (e.g., RRM measurement and reporting for LAA, etc.). Alternatively, the software/firmware code 1220 may not be directly executable by the processor 1205 but cause a computer (e.g., when compiled and executed) to perform functions described herein. The processor 1205 may include an intelligent hardware device, (e.g., a central processing unit (CPU), a microcontroller, an application specific integrated circuit (ASIC), etc.)

The components of wireless device 900, wireless device 1000, and RRM measurement and reporting components 910 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
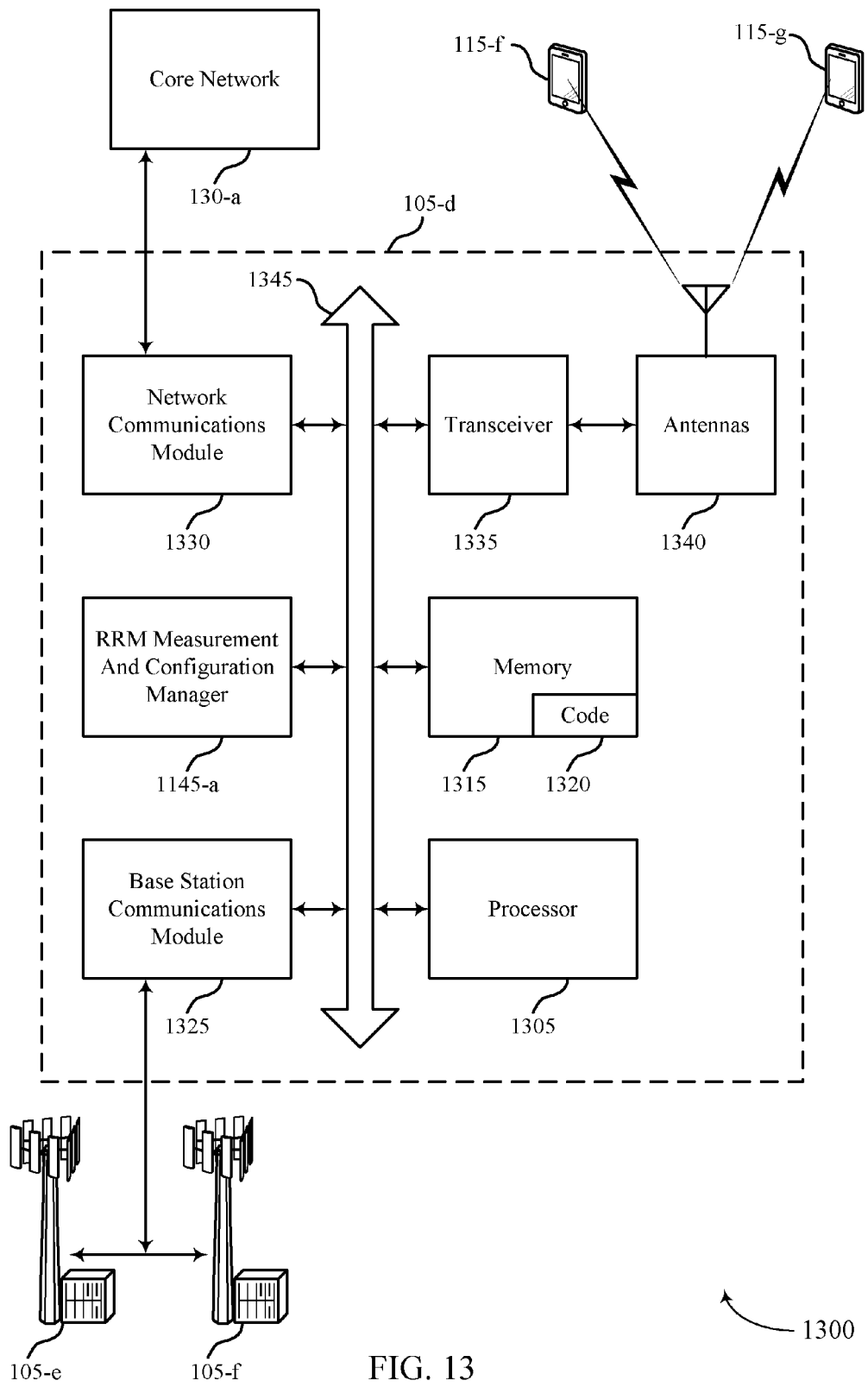
FIG. 13 illustrates a block diagram of a system including a base station that supports RRM measurement and reporting for cells in shared spectrum in accordance with various aspects of the present disclosure.

FIG. 13 shows a diagram of a system 1300 including a base station 105-*d* configured for RRM measurement and reporting for cells in shared spectrum, in accordance with aspects of the present disclosure. The base station 105-*d* may be an example of a base station 105 described with reference to FIGS. 1 and 2. The base station 105-*d* may include a RRM measurement and configuration manager 1145-*b*, which may be an example of a RRM measurement and configuration manager 1145 as described with reference to FIG. 11. The base station 105-*d* may also include components for bi-directional voice and data communications including components for transmitting communications and components for receiving communications. For example, the base station 105-*d* may communicate bi-directionally with a base station 105-*e*, a base station 105-*f*, a UE 115-*f*, and/or a UE 115-*g*.

In some cases, base station 105-*d* may have one or more wired backhaul links. Base station 105-*d* may have a wired backhaul link (e.g., S1 interface, etc.) to the core network 130-*a*. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communications manager 1325. In some examples, base station communications manager 1325 may provide an X2 interface within an LTE/LTE-A wireless communication network technology to provide communication between some of the base stations 105. In some examples, base station 105-*d* may communicate with other base stations through core network 130-*a*. In some cases, base station 105-*d* may communicate with the core network 130 through network communications manager 1330.

The base station 105-*d* may include a processor 1305, memory 1315, transceiver 1335, and antenna(s) 1340, which each may be in communication, directly or indirectly, with one another (e.g., over bus 1345). The transceivers 1335 may be configured to communicate bi-directionally, via the antenna(s) 1340, with the UEs 115, which may be multi-mode devices. The transceiver 1335 (or other components of the base station 105-*c*) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-*d* may include multiple transceivers 1335, each with one or more associated antennas 1340. The transceiver 1335 and antenna(s) 1340 may be an example of aspects of both a receiver 1155 and transmitter 1160 described with reference to FIG. 11 (e.g., a combined receiver 1155 and transmitter 1160, etc.).

The memory 1315 may include RAM and ROM. The memory 1315 may also store computer-readable, computer-executable software/firmware code 1320 containing instructions that are configured to, when executed by the processor 1305, cause the base station 105-*d* to perform various functions described herein (e.g., selecting coverage enhancement techniques, call processing, database management, message routing, etc.). Alternatively, the software/firmware code 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing managers, base band processors, radio head controllers, digital signal processors (DSPs), and the like.

The base station communications manager 1325 may manage communications with other base stations 105. The base station communications manager 1325 may include a controller or scheduler for controlling communications with UEs 115 in cooperation with other base stations 105. For example, the base station communications manager 1325 may coordinate scheduling for transmissions to UEs 115 for various interference mitigation techniques such as beamforming or joint transmission.

The RRM measurement and configuration manager 1145-*a* may be an example of a RRM measurement and configuration manager 1145 described with reference to FIG. 11, and may manage various aspects of implementing superposition coding based preamble designs for coexisting RATs as described herein. The RRM measurement and configuration manager 1145-*a* may be in communication with other components of the base station 105-*d*, directly or indirectly, over the one or more buses 1345. The RRM measurement and configuration manager 1145-*a*, or portions of it, may include a processor, or some or all of the functions of the RRM measurement and configuration manager 1145-*a* may be performed by the processor 1305 or in connection with the processor 1305.

Figure 14:
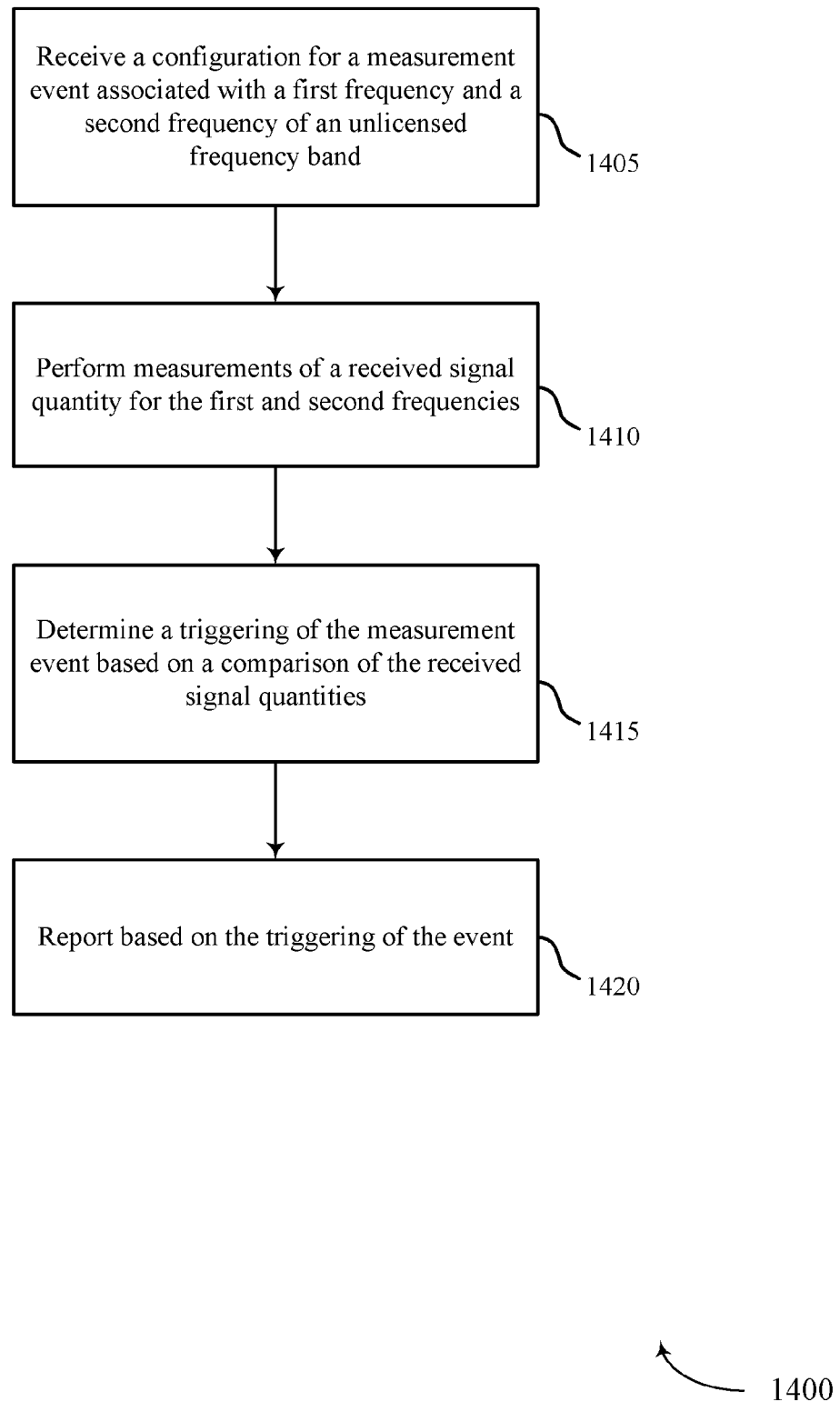
FIGS. 14-18 illustrate methods for RRM measurement and reporting for cells in shared spectrum in accordance with various aspects of the present disclosure.

FIG. 14 shows a flowchart illustrating a method 1400 for RRM measurement and reporting for cells in shared spectrum in accordance with various aspects of the present disclosure. The operations of method 1400 may be implemented by a UE 115 or its components as described with reference to FIGS. 1-13. For example, the operations of method 1400 may be performed by the RRM measurement and reporting manager 910 as described with reference to FIGS. 9-13. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may receive a RRM measurement configuration from a serving eNB, the RRM measurement configuration comprising at least one parameter related to RRM measurement for one or more frequencies of a shared frequency band as described with reference to FIGS. 2-8. The RRM measurement configuration may include a configuration for a measurement event associated with a first frequency and a second frequency of the shared frequency band. In certain examples, the operations of block 1405 may be performed by the configuration manager 920 as described with reference to FIG. 9.

At block 1410, the UE 115 may perform measurements for the first and second frequencies based at least in part on the RRM measurement configuration as described with reference to FIGS. 2-8. For example, the UE may measure a received signal quantity for the first and second frequencies. In certain examples, the operations of block 1410 may be performed by the measurement manager 925 as described with reference to FIG. 9.

At block 1415, the UE 115 may determine a triggering of the measurement event based at least in part on a comparison of the received signal quantities associated with the first frequency and the second frequency as described with reference to FIGS. 4A and 4B.

At block 1420, the UE 115 may report the occurrence of the measurement event to the serving eNB, as described with reference to FIGS. 2-8. In certain examples, the operations of block 1420 may be performed by the reporting manager 930 as described with reference to FIG. 9.

Figure 15:
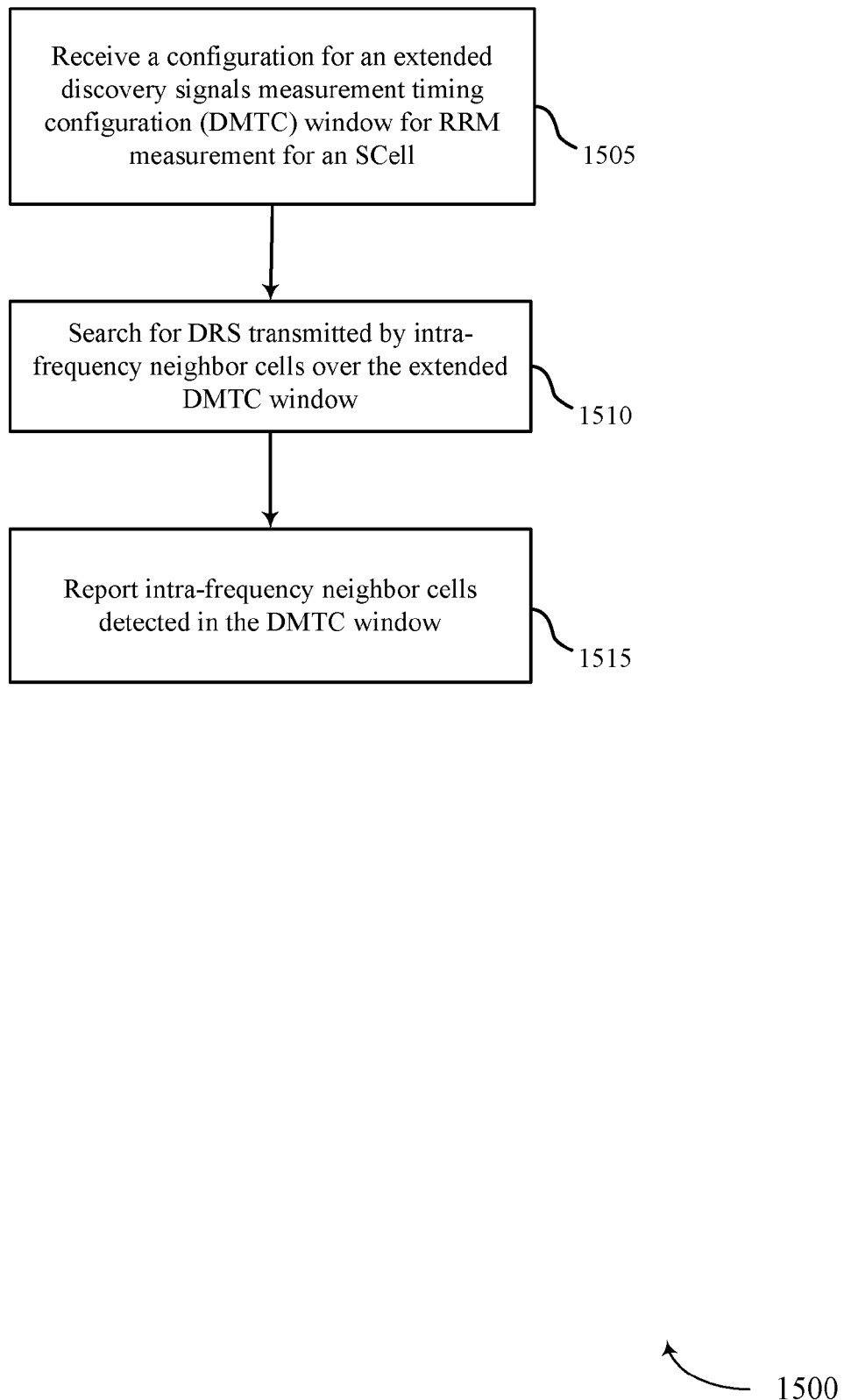

FIG. 15 shows a flowchart illustrating a method 1500 for RRM measurement and reporting for cells in shared spectrum in accordance with various aspects of the present disclosure. The operations of method 1500 may be implemented by a UE 115 or its components as described with reference to FIGS. 1-12. For example, the operations of method 1500 may be performed by the RRM measurement and reporting manager 910 as described with reference to FIGS. 9-13. In some examples, a UE 115 may execute a set of codes to control the functional elements of the UE 115 to perform the functions described below. Additionally or alternatively, the UE 115 may perform aspects the functions described below using special-purpose hardware.

At block 1505, the UE 115 may receive a RRM measurement configuration including a configuration for an extended DMTC window for a configured SCell. The extended DMTC window may be configured using a search period and a window duration. In certain examples, the operations of block 1505 may be performed by the configuration manager 920 as described with reference to FIG. 9.

At block 1510, the UE 115 may search for DRS transmitted by intra-frequency neighbor cells over a DMTC window or extended DMTC window as described with reference to FIG. 5. In certain examples, the operations of block 1510 may be performed by the extended DMTC manager 1025 as described with reference to FIG. 10.

At block 1515, the UE 115 may report, to the serving eNB, the neighbor cells detected in the extended DMTC window. The neighbor cell reporting may be performed as described with reference to FIG. 7. In certain examples, the operations of block 1515 may be performed by the reporting manager 930 as described with reference to FIG. 9.

Figure 16:
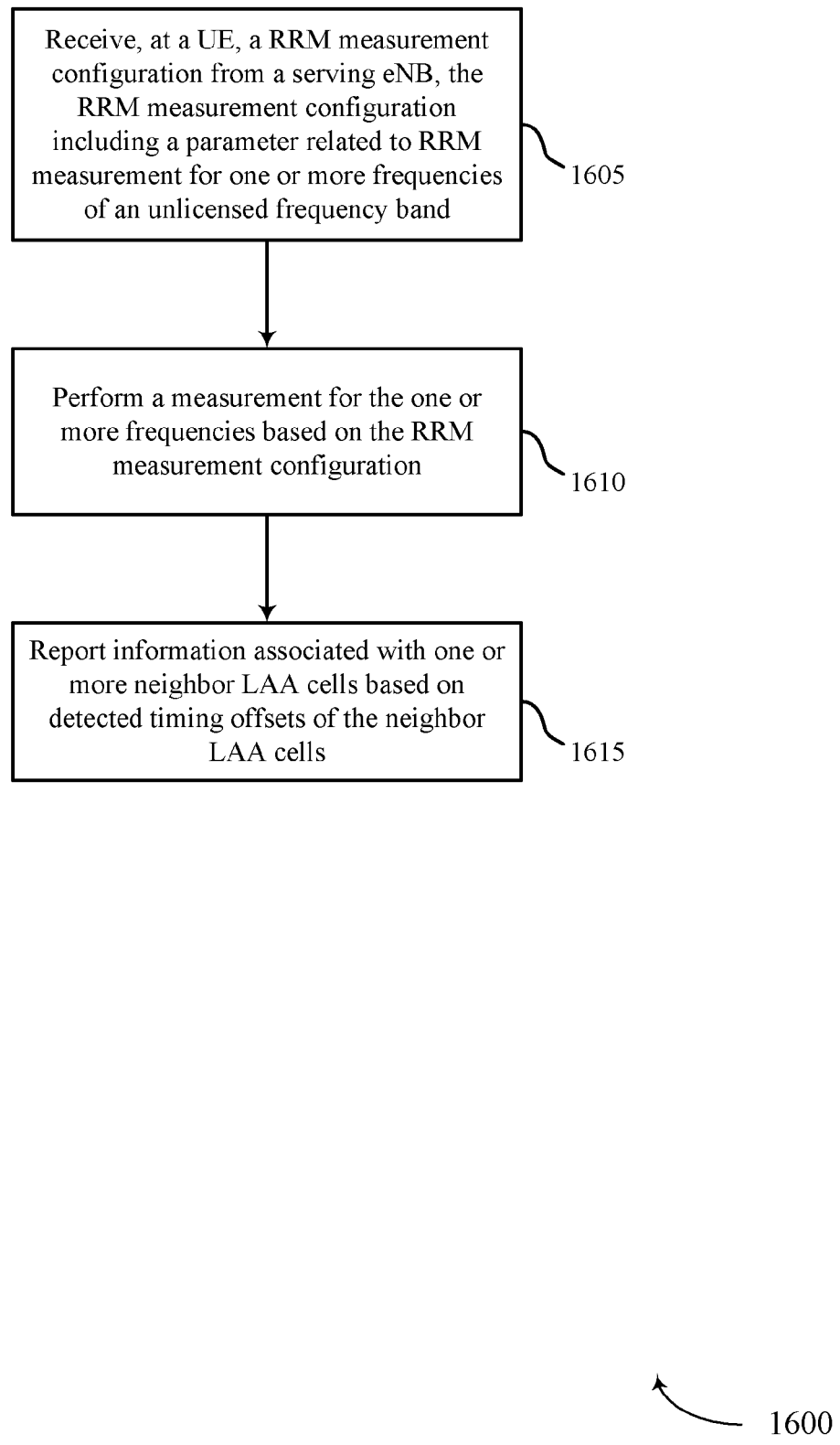

FIG. 16 shows a flowchart illustrating a method 1600 for RRM measurement and reporting for cells in shared spectrum in accordance with various aspects of the present disclosure. The operations of method 1600 may be implemented by a UE 115 or its components as described with reference to FIGS. 1-13. For example, the operations of method 1600 may be performed by the RRM measurement and reporting manager 910 as described with reference to FIGS. 9-13. In some examples, a UE 115 may execute a set of codes to control the functional elements of the UE 115 to perform the functions described below. Additionally or alternatively, the UE 115 may perform aspects the functions described below using special-purpose hardware.

At block 1605, the UE 115 may receive a RRM measurement configuration from a serving eNB. In some cases, the RRM measurement configuration includes a timing offset threshold as described with reference to FIGS. 3 and 7. In certain examples, the operations of block 1605 may be performed by the configuration manager 920 as described with reference to FIG. 9.

At block 1610, the UE 115 may perform at least one measurement for the one or more frequencies based at least in part on the RRM measurement configuration as described with reference to FIGS. 2-8. The at least one measurement may include RRM measurements of intra-frequency cells (e.g., using an extended DMTC window, etc.) or inter-frequency cells (e.g., using measurement gaps). In certain examples, the operations of block 1610 may be performed by the measurement manager 925 as described with reference to FIG. 9.

At block 1615, the UE 115 may report, to the serving eNB, information associated with one or more neighbor cells of shared spectrum based at least in part on detected timing offsets of the one or more neighbor cells relative to a frame timing of a PCell from the serving eNB and the timing offset threshold. The reporting may include reporting a subset of detected cells based on the timing offset threshold. For example, reporting may be performed for synchronous cells or asynchronous cells only. Additionally or alternatively, both synchronous and asynchronous cells may be reported, and the report may group or identify cells by timing offset. For example, multiple timing groups may be reported, with each timing group having cells that are within an associated timing offset window. In certain examples, the operations of block 1615 may be performed by the reporting manager 930 as described with reference to FIG. 9.

Figure 17:
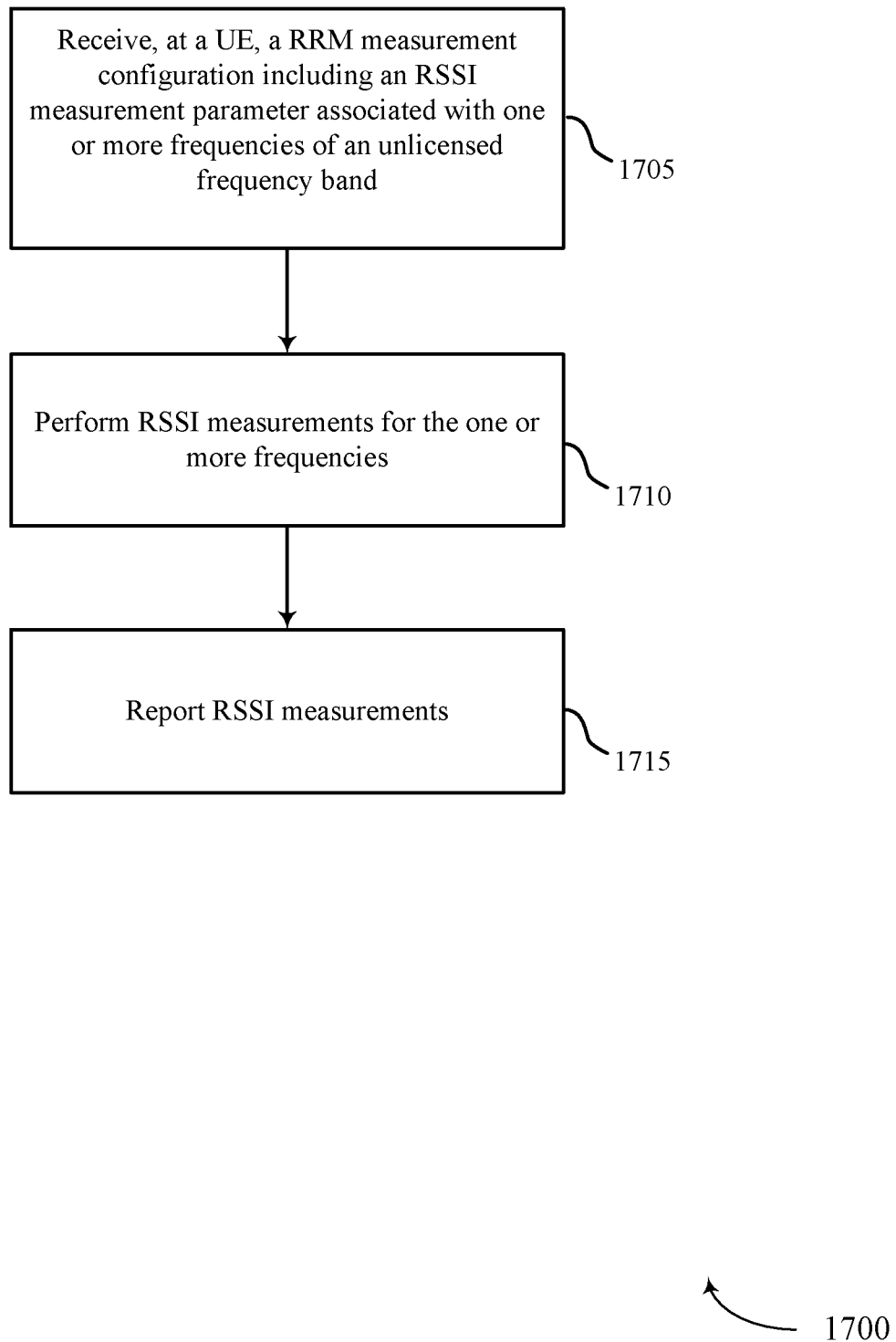

FIG. 17 shows a flowchart illustrating a method 1700 for RRM measurement and reporting for cells in shared spectrum in accordance with various aspects of the present disclosure. The operations of method 1700 may be implemented by a UE 115 or its components as described with reference to FIGS. 1-13. For example, the operations of method 1700 may be performed by the RRM measurement and reporting manager 910 as described with reference to FIGS. 9-13. In some examples, a UE 115 may execute a set of codes to control the functional elements of the UE 115 to perform the functions described below. Additionally or alternatively, the UE 115 may perform aspects the functions described below using special-purpose hardware.

At block 1705, the UE 115 may receive a RRM measurement configuration including at least one RSSI measurement parameter associated with one or more frequencies of a shared frequency band. The at least one RSSI measurement parameter may include an RSSI observation period, an RSSI measurement period, or an RSSI threshold. In certain examples, the operations of block 1705 may be performed by the configuration manager 920 as described with reference to FIG. 19.

At block 1710, the UE 115 may perform RSSI measurements for one or more frequencies based at least in part on the RRM measurement configuration as described with reference to FIGS. 2-8. In certain examples, the operations of block 1710 may be performed by the measurement manager 925 as described with reference to FIG. 9.

At block 1715, the UE 115 may report an average or filtered RSSI for the one or more frequencies. Additionally or alternatively, the UE 115 may be configured to report a RSSI profile or channel occupancy, which may indicate an amount of time or percentage of RSSI measurements for the one or more frequencies that are above the RSSI threshold for the RSSI observation period. In certain examples, the operations of block 1715 may be performed by the reporting manager 930 as described with reference to FIG. 9.

Figure 18:
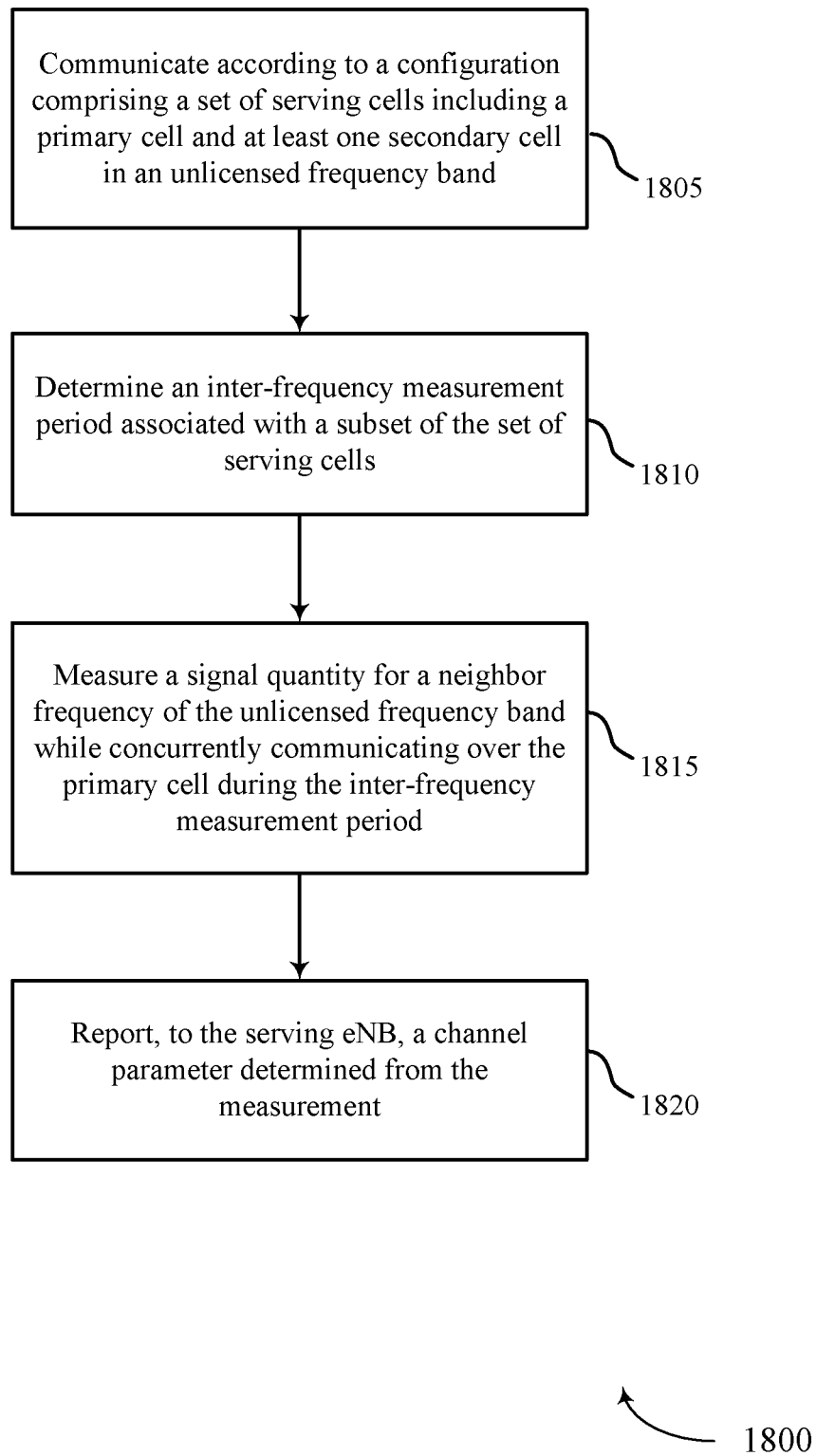

FIG. 18 shows a flowchart illustrating a method 1800 for RRM measurement and reporting for cells in shared spectrum in accordance with various aspects of the present disclosure. The operations of method 1800 may be implemented by a UE 115 or its components as described with reference to FIGS. 1-13. For example, the operations of method 1800 may be performed by the RRM measurement and reporting manager 910 as described with reference to FIGS. 9-13. In some examples, a UE 115 may execute a set of codes to control the functional elements of the UE 115 to perform the functions described below. Additionally or alternatively, the UE 115 may perform aspects the functions described below using special-purpose hardware.

At block 1805, the UE 115 may be configured for communication according to a configuration comprising a set of serving cells including a PCell and at least one SCell in a shared frequency band. In certain examples, the operations of block 1805 may be performed by the CA configuration manager 1005 as described with reference to FIG. 10.

At block 1810, the UE 115 may determine an inter-frequency measurement period associated with a subset of the set of serving cells as described with reference to FIGS. 2-8. The inter-frequency measurement period may be an autonomous gap, may be performed during known data burst gaps, or may be a configured LAA measurement gap, as described with reference to FIG. 6.

At block 1815, the UE 115 may measure a signal quantity for at least one neighbor frequency of the shared frequency band while concurrently communicating with the serving eNB over a PCell during the inter-frequency measurement period. In certain examples, the operations of block 1815 may be performed by the measurement manager 925 as described with reference to FIG. 9.

At block 1820, the UE 115 may report, to the serving eNB, neighbor cells of shared spectrum determined from the inter-frequency measurement period. The reporting may be performed, for example, as described with reference to FIGS. 3 and 7. In certain examples, the operations of block 1815 may be performed by the reporting manager 930 as described with reference to FIG. 19.

Thus, methods 1400, 1500, 1600, 1700 and 1800 may provide for RRM measurement and reporting for LAA. It should be noted that methods 1400, 1500, 1600, 1700 and 1800 describe possible implementation, and that the operations and the steps may be rearranged or otherwise modified such that other implementations are possible. In some examples, aspects from two or more of the methods 1400, 1500, 1600, 1700 and 1800 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LIE) and LTE-advanced (LTE-a) are new releases of UMTS that use E-UTRA. UTRA, E-UTRA, UMTS, LIE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term eNB may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, shared, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The DL transmissions described herein may also be called forward link transmissions while the UL transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and managers described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
receiving, at a user equipment (UE), a radio resource management (RRM) measurement configuration for one or more frequency channels of a shared frequency band, the RRM measurement configuration comprising at least one channel occupancy measurement parameter for the one or more frequency channels, wherein the at least one channel occupancy measurement parameter comprises a received signal strength indicator (RSSI) observation period;
determining at least one channel occupancy metric for the one or more frequency channels according to the at least one channel occupancy measurement parameter, wherein the at least one channel occupancy metric indicates a percentage of RSSI measurements that are above a RSSI threshold over the RSSI observation period; and
reporting, to a serving cell, the at least one channel occupancy metric.

2. The method of claim 1, wherein the at least one channel occupancy measurement parameter comprises a RSSI measurement period, the RSSI threshold, one or more filtering parameters, or combinations thereof.

3. The method of claim 2, wherein the at least one channel occupancy metric comprises at least one of an average RSSI or a filtered RSSI over the RSSI observation period.

4. The method of claim 2, wherein the RSSI observation period comprises a consecutive number of symbols for which a Physical Layer reports measurements of RSSI.

5. The method of claim 2, wherein the RSSI observation period comprises at least one RSSI measurement period.

6. The method of claim 1, wherein reporting the at least one channel occupancy metric comprises reporting for one or more serving cells, one or more intra-frequency neighbor cells, or combinations thereof.

7. The method of claim 1, further comprising:
determining the at least one channel occupancy metric comprises measuring a signal quantity for at least one neighbor frequency of a shared frequency band while concurrently communicating with a serving base station over a primary cell.

8. The method of claim 1, wherein the at least one channel occupancy metric for the one or more frequency channels is determined for a time period including one or more discovery reference signal (DRS) transmissions from a serving cell, wherein the determining comprises subtracting a reference signal received power (RSRP) associated with the serving cell from a measured received signal strength indicator (RSSI) for the one or more DRS transmissions.

9. A method of wireless communication, comprising:
configuring, by a base station, at least one user equipment (UE) for reporting at least one channel occupancy metric for channel selection of at least one frequency channel of a shared frequency band, wherein the configuring comprises sending respective radio resource management (RRM) measurement configurations for the at least one frequency channel indicating at least one channel occupancy measurement parameter for the at least one frequency channel, wherein the at least one channel occupancy measurement parameter comprises a received signal strength indicator (RSSI) observation period;
receiving, from the at least one UE, the at least one channel occupancy metric determined according to the respective RRM measurement configurations, wherein the at least one channel occupancy metric indicates a percentage of RSSI measurements that are above a RSSI threshold over the RSSI observation period; and
identifying a frequency channel for a secondary cell of the base station based at least in part on the at least one channel occupancy metric.

10. The method of claim 9, wherein the at least one channel occupancy measurement parameter comprises a RSSI measurement period, the RSSI threshold, one or more filtering parameters, or combinations thereof.

11. The method of claim 10, wherein the at least one channel occupancy metric comprises at least one of an average RSSI or a filtered RSSI over the RSSI observation period.

12. The method of claim 10, wherein the RSSI observation period comprises a consecutive number of symbols for which a Physical Layer reports measurements of RSSI.

13. The method of claim 10, wherein the RSSI observation period comprises at least one RSSI measurement period.

14. The method of claim 9, further comprising:
reporting the at least one channel occupancy metric comprises reporting for one or more serving cells, one or more intra-frequency neighbor cells.

15. An apparatus for wireless communication, comprising:
a processor;
memory in electronic communication with the processor; and
instructions stored in the memory and operable, when executed by the processor, to cause the apparatus to:
configure, by a base station, at least one user equipment (UE) for reporting measurements for channel selection assistance for at least one frequency channel, wherein the configuring comprises sending respective radio resource management (RRM) measurement configurations for the at least one frequency channel indicating at least one parameter associated with channel occupancy for the at least one frequency channel, wherein the at least one parameter associated with channel occupancy comprises a received signal strength indicator (RSSI) observation period;
receive, from the at least one UE, at least one channel occupancy metric measured according to the RRM measurement configuration, wherein the at least one channel occupancy metric indicates a percentage of RSSI measurements that are above a RSSI threshold over the RSSI observation period; and
identify a frequency channel for a secondary cell of the base station based at least in part on the at least one channel occupancy metric.

16. The apparatus of claim 15, wherein the RRM measurement configuration comprises at least one RSSI measurement parameter associated with the at least one frequency channel, the at least one RSSI measurement parameter comprising an RSSI measurement period, the RSSI threshold, or combinations thereof, and wherein the instructions are operable, when executed by the processor, to cause the apparatus to report an average RSSI over the RSSI observation period or an indicator of an amount of time the RSSI measurements for the at least one frequency channel is above the RSSI threshold for the RSSI observation period, or combinations thereof.

17. The apparatus of claim 16, wherein the RSSI observation period comprises at least one RSSI measurement period.

\* \* \* \* \*